United States Patent [19]
Dingwall et al.

[11] Patent Number: 5,491,482
[45] Date of Patent: Feb. 13, 1996

[54] ELECTRONIC SYSTEM AND METHOD FOR REMOTE IDENTIFICATION OF CODED ARTICLES AND THE LIKE

[75] Inventors: Andrew G. F. Dingwall, Princeton; Jonathan L. Schepps, Princeton Junction, both of N.J.

[73] Assignee: David Sarnoff Research Center, Inc., Princeton, N.J.

[21] Appl. No.: 998,164

[22] Filed: Dec. 29, 1992

[51] Int. Cl.⁶ .................................................. G01S 13/74
[52] U.S. Cl. ................................................ 342/42; 342/44
[58] Field of Search ........................................ 342/42, 44

[56] References Cited

U.S. PATENT DOCUMENTS

| | | | |
|---|---|---|---|
| 3,689,885 | 9/1972 | Kaplan et al. | 342/42 |
| 3,739,329 | 6/1973 | Lester . | |
| 4,075,632 | 3/1991 | Baldwin et al. | 343/6.8 |
| 4,242,663 | 2/1979 | Slobodin | 340/152 T |
| 4,360,810 | 11/1982 | Landt | 343/6.4 |
| 4,649,385 | 3/1987 | Aires et al. | 379/197 |
| 4,739,328 | 4/1988 | Koelle et al. | 342/44 |
| 4,782,345 | 11/1988 | Landt | 343/727 |
| 4,786,907 | 11/1988 | Koelle | 341/1 |
| 4,816,839 | 3/1989 | Landt | 343/795 |
| 4,835,377 | 5/1989 | Brown | 235/492 |
| 4,853,705 | 8/1989 | Landt | 343/803 |
| 4,864,158 | 9/1989 | Koelle et al. | 307/231 |
| 4,888,591 | 12/1989 | Landt et al. | 342/44 |
| 4,912,471 | 3/1990 | Tybuarski et al. | 342/42 |
| 4,955,000 | 9/1990 | Nastrom | 367/117 |
| 4,955,038 | 12/1988 | Lee et al. | 375/35 |
| 4,977,619 | 12/1990 | Crimmins | 455/607 |
| 4,999,636 | 3/1991 | Landt et al. | 342/90 |
| 5,030,807 | 7/1991 | Landt et al. | 235/375 |
| 5,055,659 | 9/1991 | Hendrick et al. | 235/439 |
| 5,124,699 | 7/1990 | Terovert et al. | 340/825.54 |
| 5,245,346 | 4/1993 | Nishimura et al. | 342/42 |
| 5,305,008 | 4/1994 | Turner et al. | 342/44 |

FOREIGN PATENT DOCUMENTS 2230365  2/1989  United Kingdom .

OTHER PUBLICATIONS

"Microwave Tag. I.D. Systems", Daniel Mawhinney, pp. 589–610, RCA Review, vol. 44, Dec. 1983.
"Personnel Tracking System", McEachem, Prost, Hampel & Mawhinney, pp. 57–63, RCA Engineering, 28-6 Nov.–Dec. 1983.

Primary Examiner—Mark Hellner
Attorney, Agent, or Firm—W. J. Burke

[57] ABSTRACT

There is described an electronic interrogation and identification (I/I) system in which an interrogator/reader (I/R) unit operates remotely using a microwave beam in conjunction with one or more coded articles. The articles are identified by a unique method and search sequence. As the I/R unit interrogates the articles, one or more of them respond to the I/R unit whenever a code word (data value) sent from the I/R unit matches a code word stored in one or more of the memory positions within the articles. After searching through all of the possible code words and word positions the I/R unit will have identified at least one code word stored in each of the word positions of at least one article. Then combinations of the just-identified code words are matched with the respective stored words of the various articles. After being uniquely identified each article is "powered-down" on command from the I/R unit and remains inactive so that one-by-one all remaining articles are also identified.

59 Claims, 13 Drawing Sheets

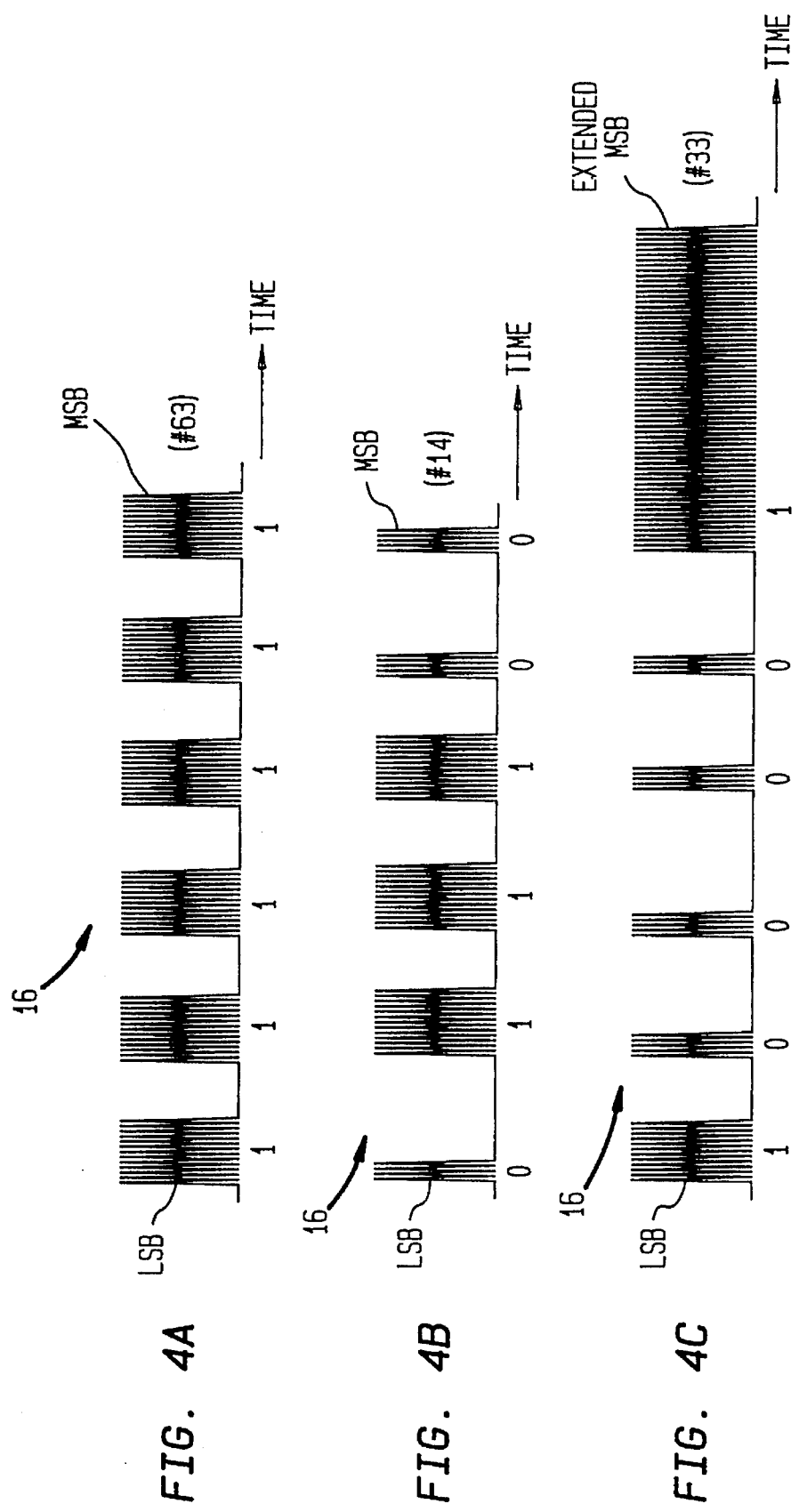

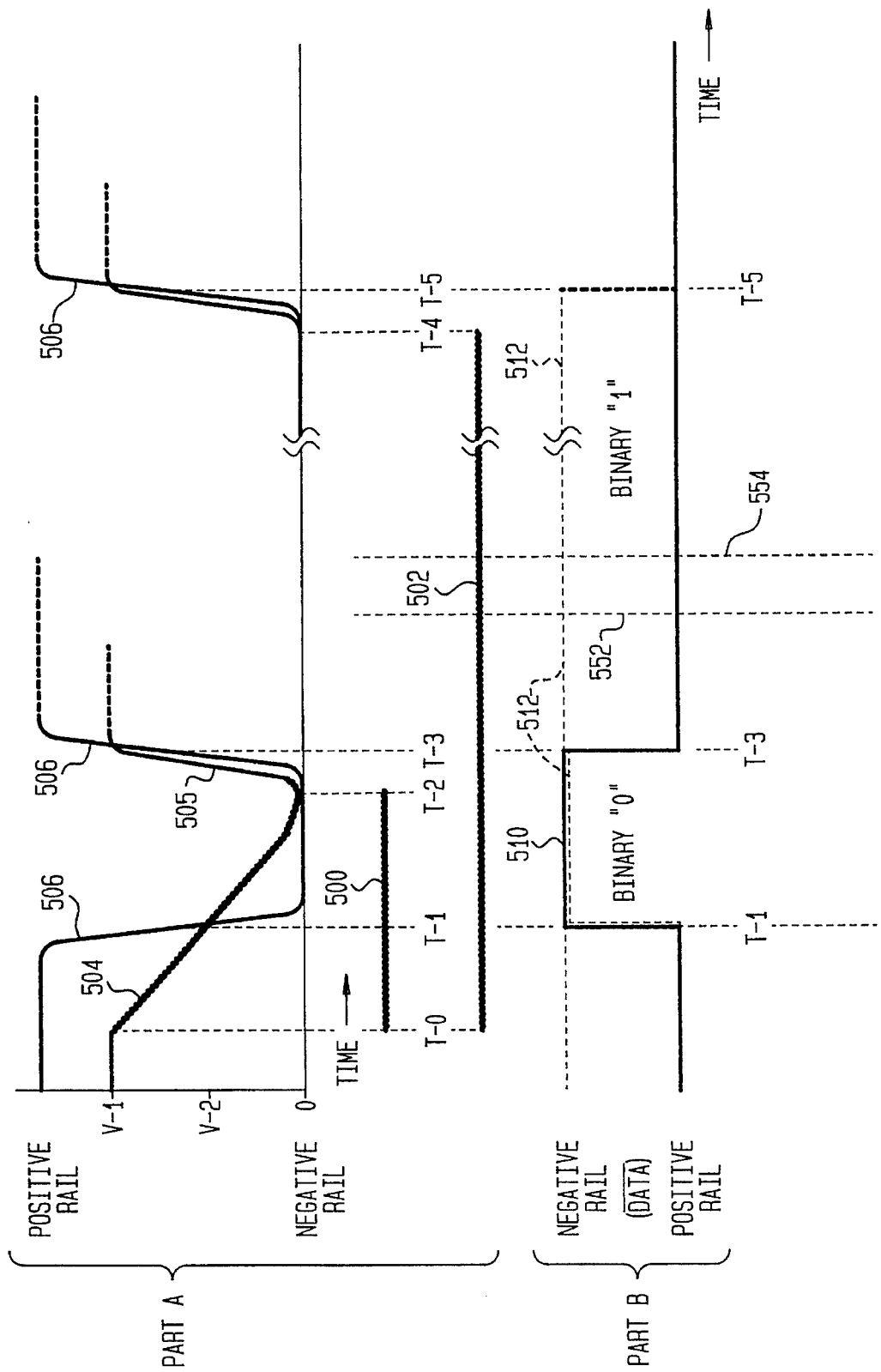

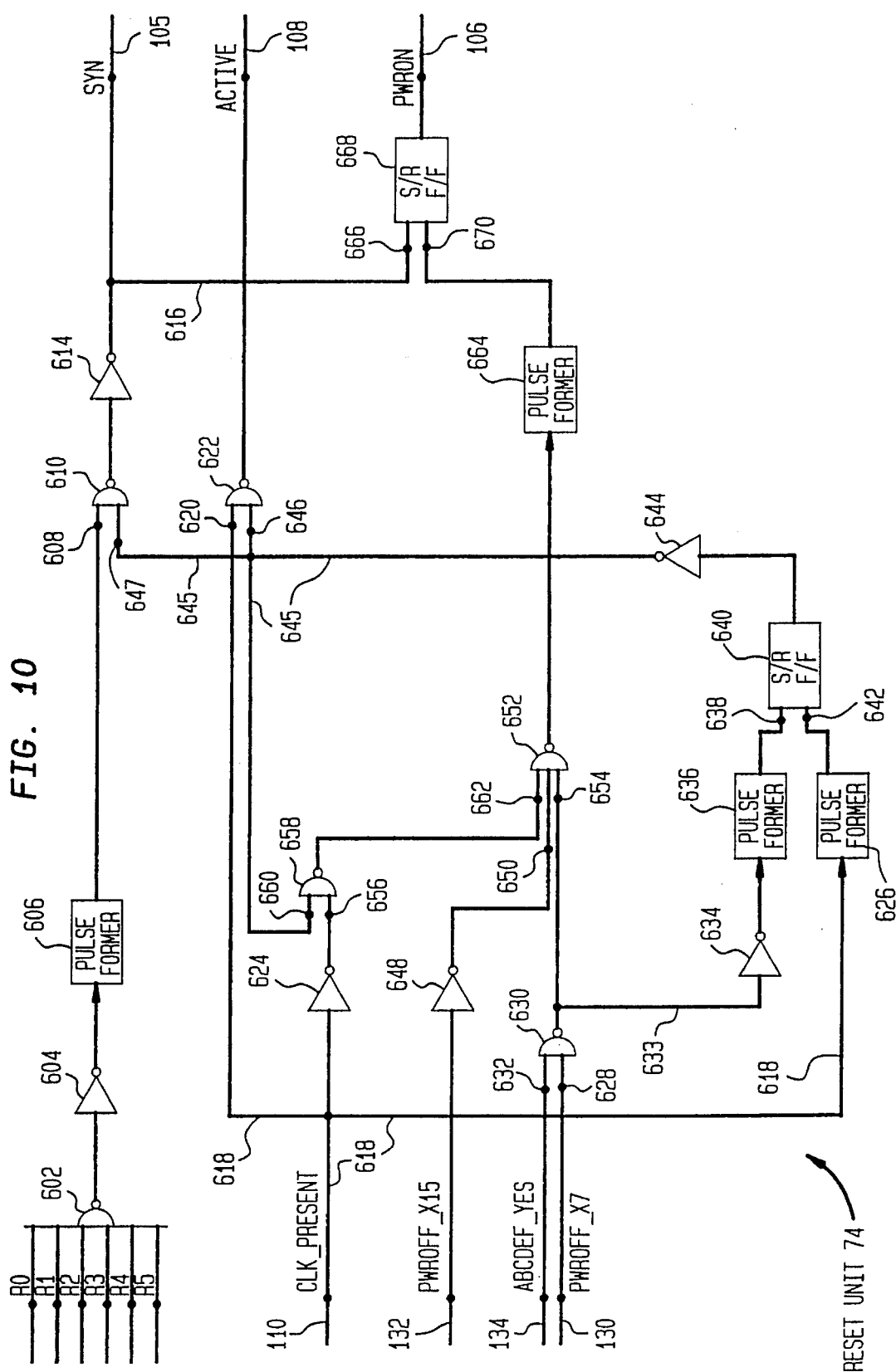

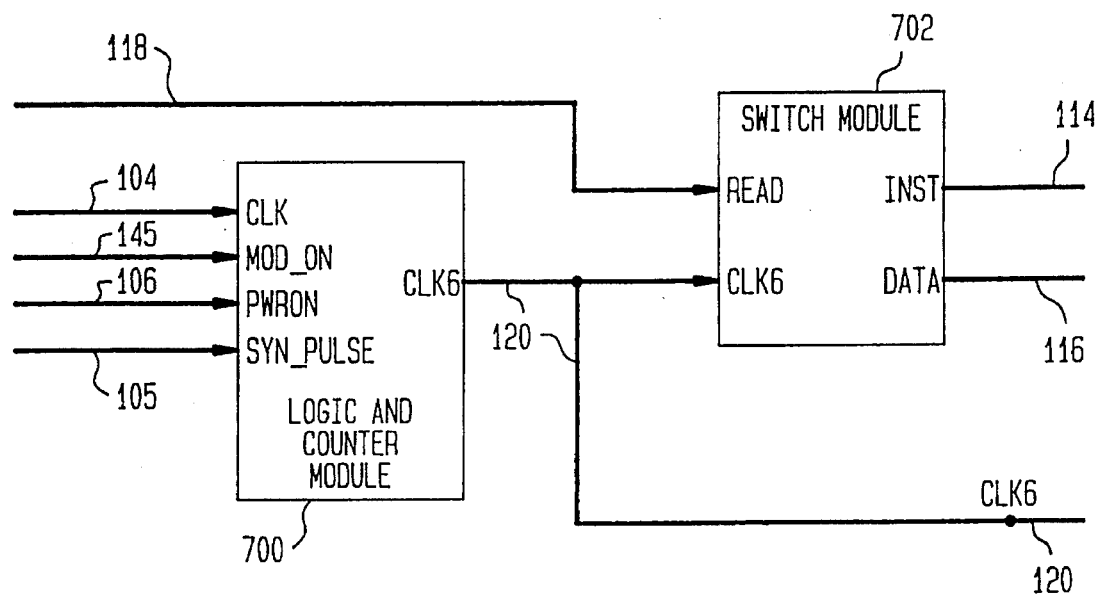

ELECTRONIC SYSTEM AND METHOD FOR REMOTE IDENTIFICATION OF CODED ARTICLES AND THE LIKE

This invention relates to a highly economical and efficient apparatus and method for remotely interrogating and identifying simultaneously a number of electronically coded articles with great rapidity (within a small fraction of a second), and with extreme accuracy and security (correct identification of any of over 60 billion coded numbers).

BACKGROUND OF THE INVENTION

Bank credit cards, employee identification (ID) badges, coded tags and the like frequently have a magnetic strip on a face of thereof. Coded information such as an account status, employee ID number, entry authorization, etc., is recorded on the strip for subsequent retrieval and use. To read the information on the card, it must be physically placed in a suitable card reader apparatus. Only one card at a time can be read by a given card reader and it is necessary to bring each card directly to the card reader. While this way of identification of a card has the advantage of very low cost coding of the card, it has the important disadvantage of requiring the physical insertion of the card into a card reader, and the need for queuing of the cards to be read in turn, one at a time.

Various systems for the remote identification of moving objects such as railroad cars, have been developed in the past. One of the simplest systems uses an optical bar code applied to the side of each car. As the car moves past a given location an electronic monitor projects a laser beam from some distance away and scans the bar code. The monitor picks up reflected light from the laser beam as the bar code is scanned and produces electronic signals corresponding to the code for that particular car. While such a system can read a coded object (via the bar code) on-the-fly from some feet away, the system becomes inaccurate or inoperable when fog, dirt, and the like obscure the reflected laser light. Even when working as intended, the system relies on the laser light beam impinging on and being properly reflected back from the optical bar code within certain narrow angles.

Use of radio frequency as the data communication link in remote interrogation/identification (I/I) systems is also well known. An article entitled "Microwave Tag Identification Systems" by Daniel D. Mawhinney, pp. 589 to 610, RCA Review, Vol. 44, December 1983, discusses in detail various kinds of such systems using microwave frequencies. As this article points out, coded objects (such as badges, tags, etc.) to be identified can be categorized as "passive", "driven", and "active". An example of a "passive" tag is one having an optical bar code. A simple example of a tag which is "driven" is one having a diode and tuned circuit which when energized by an interrogating radio frequency (RF) signal emits an uncoded response signal. An example of an "active" tag is one which has its own power source (typically a battery). When interrogated, an active tag responds by transmitting a coded signal which serves to uniquely identify the tag. Disadvantages of passive tags are the considerable difficulties of remotely interrogating and uniquely identifying each of them with RF signals. Similarly, driven tags have these same disadvantages to one degree or another, and further require that the interrogating RF signal provide a considerable amount of power to energize adequately the driven tag in its response. This requirement that the RF signal be powerful enough to energize a passive tag means that such a system is severely limited in its applications because of concern for human safety where high frequency radio field energy is present, and because of FCC radio transmission restrictions. "Active" tags on the other hand, have in the past been bulky and of limited operating life because of the relatively large amount of power consumed by the tag circuitry and the limited power capacity of a small battery. In the microwave system using active tags described in the above identified article, the tags themselves were relatively costly, and the number of code combinations which could be used were limited.

It is desirable for several reasons to employ a microwave beam (with beam power well below health and safety limits) to interrogate personnel ID badges and the like. A microwave signal has a relatively short wavelength and hence is easy to focus into a directional beam. Such a beam is easily able to pass through ordinary clothing and hence can detect and identify a badge even when carried in a person's pocket. Moreover, a directional beam is less likely to be confused by unwanted reflections, or other kinds of interference. Additionally, a very large amount of coded information for interrogating and uniquely identifying a badge or badges can be transmitted via a microwave signal in a very short time. But in order for electronically coded badges to be useable with a low power microwave beam, the electronic circuitry employed in a badge must have excellent input sensitivity at microwave frequencies, it should also, as a practical matter, be able to accommodate a very large number of code combinations (e.g., many millions). And in order to operate for a long time (many years) with a minute-size battery the circuit must draw extremely low average current (e.g., substantially less than 1 microampere). These combined objectives have not previously been met.

In an article entitled "Personnel-Tracking System", by McEachern, Prost, Hampel and Mawhinney, pp. 57 to 63, RCA Engineer, 28-6, Nov.–Dec. 1983, the authors describe a microwave-based tracking system in which a uniquely coded, battery powered badge (credential) is issued to each user. The badges are interrogated by a 10.5 GHz microwave carrier having sixteen frequency-modulated tones. Each badge is set to monitor one of these tones and, upon detection, transmits a return pulse in one of sixty-four time slots on one of eight preassigned frequencies in the range of 200 to 300 MHz. A number of badges in a given location can thus be interrogated all together and identified one by one separately. However, this system permitted only about 8000 code combinations and the battery in a badge lasted only about 3 months due to heavy current drain by the electronic circuit of the badge.

A microwave identification system described in U.S. Pat. No. 4,912,471 has a coded "target" (electronically coded device) which is powered separately (though momentarily) by an auxiliary low frequency energizing field (e.g., 25 KHz). The target, using internally stored electric power derived from the auxiliary energizing field, then transmits its coded information to an interrogator when the interrogator scans the target with an unmodulated microwave beam (915 MHz). The target modulates the impedance of its receiving antenna in accordance with coded information stored in memory within the target. In this way a reflected, code-modulated microwave signal from the target antenna is sent to the interrogator where the signal is received and decoded. There is no transmission of data (other than the unmodulated microwave beam itself) from the interrogator to the target. The microwave beam used in this system has a low power level (within FCC regulations), and a given target is able to accommodate a large number of code combinations. But an important restriction on use of this system is that it is able to interrogate and identify only one target at a time. The system is unable to handle multiple targets all at the same time. Moreover, the system is relatively complex and costly.

It is desirable to provide an electronic I/I system which overcomes most, if not all, of the limitations, restrictions and drawbacks of the systems described above. To this end coded articles such as badges, tags and the like should have ultra-low power consumption to operate with a micro-size battery for a time substantially as long as the shelf-life of the battery (e.g., 4 years or more), very low cost, excellent sensitivity at suitable frequencies (e.g., microwave) to provide reliable operation with RF field power levels well below the limits permitted by FCC regulations and health and safety standards, ability to handle a very large number of code combinations, ultra-secure code storage along with the ability to remotely re-write the code, ability for a number of different articles to be remotely interrogated at the same time (a small fraction of a second) and for each article to be uniquely identified while still in the presence of the others, and small size.

It is also desirable that an interrogator/reader (I/R) unit for use with the articles use low cost off-the-shelf components for radio (microwave) transmission and for data coding and decoding, have the ability to transmit and receive very low power encoded signals at radio frequencies (no site licensing requirement, no health hazard), the ability to operate with a unique algorithm to interrogate/identify multiple articles simultaneously (in a small fraction of a second), input/output (I/O) interface with various code formats, such as RS-232, Weigand, Track 2ABA, etc and the ability to remotely program the articles with new identification data.

SUMMARY OF THE INVENTION

In accordance with one aspect of the invention there is provided an electronic I/I system in which an I/R unit operates remotely using a microwave beam in conjunction with one or more article in which are electronically stored respective ID code numbers. Each article is self-powered by a micro-size battery and its electronic circuit draws so little current on average that the operating life of an article is, in effect, the shelf life of its battery. Upon detecting the presence of an article(s), the I/R unit begins to interrogate them all at once in accordance with a unique search sequence. The particular ID number of each article is stored in fragments in respective memory positions in the article as a plurality of binary "words" (for example six 6-bit words). As the I/R unit interrogates the articles, one or more of them respond to the I/R unit whenever a code word (data value) sent from the I/R unit matches a code word stored in one or more of memory positions of the articles. After searching through all of the possible code words and word positions the I/R unit will have identified at least one code word stored in each of the word positions of at least one badge (assuming the article has a valid ID number). The I/R unit then proceeds with the search sequence in which the possible combinations of the just-identified code words are matched with the respective word positions of the various article. The ID number of each article is thus uniquely identified. After being identified, an article is "powered-down" on command from the I/R unit and remains inactive so that one-by-one all remaining article are also very quickly identified. This I/I system operates with great efficiency and speed and is highly accurate and secure.

In accordance with another aspect of the invention, the electronic circuitry of an article is implemented using complementary metal oxide semiconductor (CMOS) technology. The circuitry is designed to operate in accordance with digital word commands and data values received via a small antenna in the badge from the I/R unit and to respond to the I/R unit at appropriate times by modulating the impedance of this antenna while the I/R unit is transmitting its microwave beam. In an important feature of the invention, input elements of the electronic circuitry are uniquely arranged to detect and demodulate at extremely low voltage levels the microwave signals being transmitted from the I/R unit to an article. Coded information (instruction and data words) in easily handled bit-word format is thus applied to the remaining circuitry of the article. This design greatly simplifies the manufacture and quality assurance of the article and contributes to their small size, long life and cost effectiveness. The electronic circuit is capable of operating over a wide frequency range and is not restricted merely to signals generally classed as microwave signals. The circuit in fact responds to "DC" (direct current) level input binary signals applied to the input thereof.

In accordance with another aspect of the invention the I/R unit is designed to operate in conjunction with one or more article at the same time using the unique search sequence of the invention in such a way as to provide substantially error-free operation. The I/R unit employs a unique set of coded instructions and data commands to iteratively interact with the articles. articles are individually identified with essentially perfect accuracy and code security.

The present invention is also directed to electronic apparatus for interrogating/identifying coded articles. The apparatus comprises an I/R unit and a plurality of coded articles. The I/R unit transmits to the articles at a suitable frequency a stream of binary bits of instruction and data words, and receives responses from each article. Each of the articles has circuitry for storing as digital bits an identifying code number. The circuitry of each article has means for detecting and demodulating the incoming bit stream from the I/R unit, and for generating clock and timing signals slaved to the bit stream for framing the incoming digital words. The circuitry has logic means for responding internally to the instruction and data words of the bit stream and for responding externally to the I/R unit at selected times such that the code number of an article is uniquely identified and that article alone among many communicates solely with the I/R unit when so identified.

The invention is also directed to an electronic circuit for a coded article. The circuit comprises an input detector/demodulator (D/D), memory means for storing coded information as a plurality of digital words, logic and control means, and signalling means. The input D/D detects incoming digital word microwave signals and has a first pair of metal oxide semiconductor (MOS) transistors connected as a common-gate source-driven amplifier, the source of one of the transistors being connected to an input for the microwave signal. The D/D also has a second pair of MOS transistors supplying the first pair of MOS transistors with substantially constant currents which are unequal. It generates binary "0" and "1" pulses corresponding to the digital word microwave signals. The memory means stores coded information as a plurality of digital words. The logic and control means are connected to the D/D and memory means for comparing digital words from the microwave signal with the words stored in the memory means. The signalling means is connected to the logic and control means for generating a response signal when the digital words of the microwave signals and the stored words match.

The invention is also directed to an MOS detector for microwave signals. The detector comprises first and second MOS transistors, first and second controlled current sources, a first capacitor, and a second capacitor. The first and second MOS transistors are connected as a common-gate source-driven amplifier with the gates of the two transistors being connected to the drain of the first transistor, the source of the first transistor being connected to a first voltage rail, the source of the second transistor is connected to an input for the microwave signals. The first and second controlled current sources supply unequal currents to the first and second MOS transistors. The first capacitor is connected between the drain of the first transistor and the first rail; and the second capacitor is connected between the drain of the second transistor and the first rail. The voltage on the second capacitor has a quiescent value in the absence of a microwave signal and is incrementally changed a slight amount by each cycle of the microwave signal thereby substantially changing the voltage after a sufficient number of cycles of the microwave signal.

The invention is also directed to a method of remotely interrogating and identifying articles in which a plurality of coded digital words are electronically stored. The method comprises a step of transmitting a bit stream of instruction and data words to each and all articles present to determine the presence of at least one article. A next step is sequentially sorting through all possible combinations of values of the plurality of coded words stored in each and all articles. A next step is tabulating the matches found between transmitted and stored words of each and all articles and responding by the article when a match is found. A next step is determining that at least one article has matches with all of its stored words; and a next step is transmitting instruction and data words to the articles to sort out all possible combinations of matched words in all of the articles which have responded. A last step is responding by the articles one-by-one when each is uniquely identified.

BRIEF DESCRIPTION OF THE DRAWING

FIGS. 4A, 4B, and 4C show different coded RF signals transmitted from the interrogator/receiver unit to a badge;

FIG. 10 is a schematic circuit diagram of a portion of the circuitry of a badge;

FIG. 11 is a schematic circuit diagram of another portion of the circuitry of a badge.

DETAILED DESCRIPTION

Figure 1:
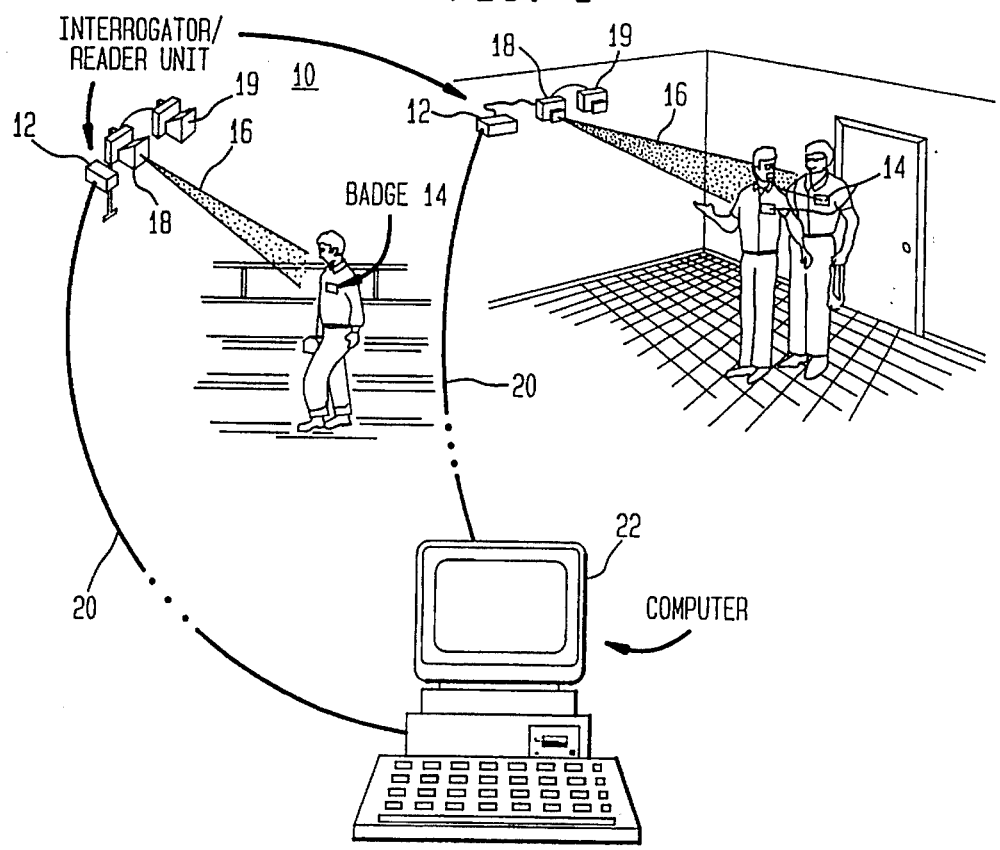
FIG. 1 is a schematic illustration of an I/I system employing at least one radio-frequency (microwave) I/R unit and multiple, electronically coded badges.

In FIG. 1, an I/I system 10 comprises one or more interrogate/reader (I/R) units 12, one or more badges 14, respective transmit and receive antennas 18 and 19, and a central computer 22. The I/R units 12 operate at a suitable radio frequency or microwave frequency (e.g., 915 MHz or 5.8 GHz) and transmit microwave (radio frequency) beams 16. The badges 14 (which uniquely identify individual employees) are internally powered and are interrogated by respective beams 16 transmitted from the directional antennas 18 of the I/R units 12 positioned at selected locations. Each I/R unit 12 in addition has a receiving antenna 19 which is closely similar to the transmitting antenna 18. The I/R units 12 are connected via respective cables 20 to a desk top computer 22. In the course of being interrogated via a microwave beam 16 from an I/R unit 12, a badge or badges 14 reply electronically by reflecting a portion of the same beam 16 back to the receiving antenna 19 of the I/R unit 12. The badges 14 thus uniquely identify themselves in accordance with their respectively coded, electronically stored ID numbers. As will be explained shortly, each badge may be coded with any one of over 60 billion different numbers. By way of example, five or so different badges 14 may at one time be interrogated and identified (when in range of detection) by a respective I/R unit 12 in less than 20 milliseconds. As soon as a badge 14 has been identified, its electronic circuit is put into an inactive or "power down" state so that badge 14 does not continue to respond to the I/R unit 12 for so long as that badge (once it has been identified) remains within range of the respective beam 16. In addition to conserving power, this facilitates the identification of a number of badges 14 present at the same time, as will be explained in detail hereinafter. Once a badge 14 is moved out of range of the beam 16, the electronic circuit of the badge 14 automatically returns itself to a quiescent state in which it draws negligible current from its internal power source. But even in quiescent state, a badge 14 has great input sensitivity to a beam 16 so that the badge remains able to detect and respond to very low power density levels of a beam 16. By way of example, the power density of the beam 16 immediately in front of the transmitting antenna 18 of the I/R unit 12 is only about 0.3 mW/cm$^2$, which is only one-tenth the level set by health and safety standards. The power density of the beam 16 at the location of the badge 14 itself is substantially lower.

Figure 2:
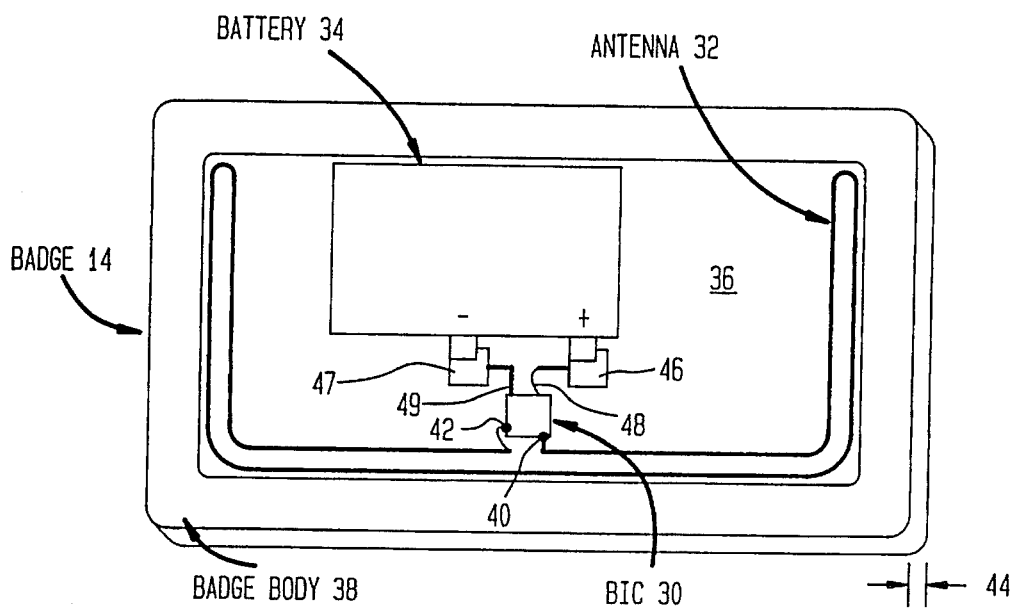
FIG. 2 is an X-ray like view of a badge showing at about full-size the component parts of the badge.

Referring now to FIG. 2, there are shown (slightly larger than full size) the component parts of a typical badge 14 of the present invention. These parts comprise a badge-integrated-circuit (BIC) 30, an antenna 32, a very thin battery 34, an insulating substrate 36 (such as a PC board), and an outer plastic body 38. The body 38, for the sake of illustrating the parts enclosed within it, is shown as being transparent, but the body 38 may in fact be opaque plastic. The BIC 30, by virtue of important features of the invention to be described in detail shortly, can be entirely implemented in complementary metal oxide semiconductor (CMOS) technology as a single IC chip. As such, the BIC 30 comprises the entire electronic circuitry required for operation of the badge 14 in the I/I system 10. The badge 14, accordingly is highly cost effective. The BIC 30 is mounted on the insulating substrate 36 and is connected at terminals 40 and 42 to respective ends of the antenna 32. The antenna 32, by way of example, is a half-wavelength folded dipole variation tuned to the frequency of a 915 MHz beam 16. The antenna 32 can be formed as a printed circuit trace on the substrate 32 and configured in a "U" shape as shown. Other antenna types such as loops or patches are equally suitable.

The thickness of the badge body 38 is indicated along its right edge by the dimension 44 and is only slightly greater than the thickness of the battery 34. By way of example, the battery 34 can be a lithium battery only about 30 mils thick, having a rating of 3 V, and a capacity of 50 mA-hr. Such batteries are commercially available. Plus and minus terminals of the battery 34 are connected to pads 46 and 47, respectively, on the substrate 36, and these pads 46 and 47 are in turn connected to power input terminals (not shown in FIG. 1 but shown in FIG. 2) of the BIC 30. The average current drain of the BIC 30 is so low (e.g., substantially less than 1 microampere) that the service life of the battery 34 is effectively its shelf life (e.g., four years or more). It is noted that the BIC 30, the antenna 32, and the battery 34 are very easily mounted on the substrate 36 and connected together as shown. These four parts are identical in every badge 14, and the parts (particularly the BIC 30) can be checked for proper functioning at various stages before the badge body 38 is assembled and sealed. Thus the manufacturing and assembly of the badges 14 is very simple and a high degree of quality and uniformity is assured. Respective ID code numbers are subsequently electronically written into the badges 14 thereby uniquely identifying each badge 14. The stored code number of a badge 14 may be re-written whenever desired.

Figure 3:
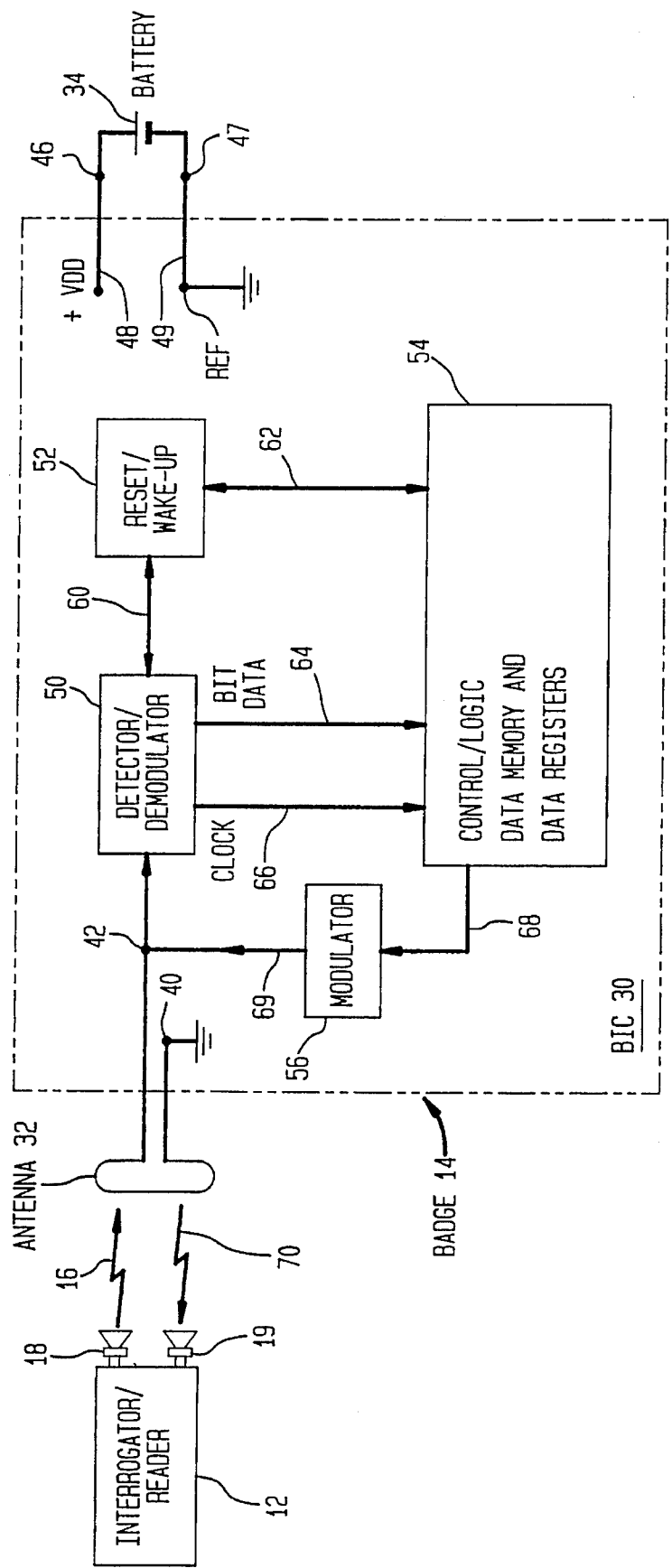
FIG. 3 is a very simplified schematic circuit diagram of the I/R unit and of a single badge of the system of FIG. 1.

Referring now to FIG. 3, there is shown an abbreviated and simplified schematic circuit the I/I system 10. This system includes the I/R unit 12, with its beam 16, the transmission antenna 18, the receiving antenna 19, and the BIC 30, the remote antenna 32 and the battery 34 of a badge 14 (the body of which is not shown here). The beam 16 is received by the remote antenna 32 and a RF voltage is applied as an input signal to a terminal 42 (see also FIG. 2) of the BIC 30 (shown in FIG. 3 within a closed line rectangle). The positive terminal of the battery 34 is connected to the lead 48 which is coupled to a terminal +VDD, and the negative terminal of the battery 34 is connected to the lead 49 which is coupled to a reference terminal (REF) shown coupled to ground potential. The circuitry of the BIC 30 (advantageously a single CMOS chip) is arranged in blocks schematically shown here as a detector/demodulator block 50, a reset/wake-up block 52, a control/logic data memory and data registers block 54, and a modulator block 56. Incoming coded signals (to be described in detail shortly) on the beam 16 are detected and demodulated in the block 50, which is always turned on. Other portions of the BIC 30, when not in range of a beam 16, are turned off. When a "reset" instruction from the I/R unit 12 is properly detected and demodulated by the block 50, block 50 applies a "reset" data word via a path 60 to the reset/wake-up block 52 which in turn applies a power-on signal via a path 62 to the control/logic data memory and data registers 54. Bit data and clock signals from the block 50 are applied via paths 64 and 66 to the block 54, which after being turned on, responds to the instructions and coded "words" being received by the BIC 30 from the I/R unit 12. By way of example, an identifying number for an employee to which a particular badge 14 is assigned is in the form of six 6-bit "words" stored in six memory registers (identified as A through F but not shown in FIG. 3) in the block 54 of the BIC 30. To identify this 36-bit number, which may be any one of over 60 billion decimal numbers, the I/R unit 12 interrogates each badge 14 "word" by "word". And the BIC 30 in turn, by operation of its modulator block 56 via a path 68 from the block 54, replies to the I/R unit 12 at appropriate intervals, until the badge 14 has completely identified itself. This iterative procedure of I/I will be described in detail shortly. Once a particular badge 14 has been identified, the BIC 30, on instruction from the I/R unit 12, holds itself in a "powered-down" state in which the BIC 30 no longer responds to the I/R unit 12 (so long as the badge remains within range of the beam 16). When a badge 14 is removed from the range of a beam 16, the BIC 30 automatically "resets" itself to a quiescent condition (though the detector/demodulator block 50 remains on). The BIC 30 thereafter wakes-up again (i.e., is fully activated) when it next receives a "reset" instruction from the I/R unit 12.

Table 1 is given, by way of example, of the various instructions and reset command issued by the I/R 12 to a BIC 30 in the course of identifying a badge 14 or badges 14. The instructions are in the form of 6-bit binary "words". Data and other "words" (not shown) are also in 6bit binary word form.

TABLE 1

| Line No. | Instruction/Function | Mnemonic | Binary Value | Decimal Value |
| --- | --- | --- | --- | --- |
| 1 | Power-down on match | POWERDOWN | 000111 | 7 |
| 2 | Unconditional power-down | PDOWNNOW | 001111 | 15 |
| 3 | Lock write | LOCK | 001110 | 14 |
| 4 | Set A-flag on match | SETA | 010000 | 16 |
| 5 | Set B-flag on match | SETB | 010010 | 18 |
| 6 | Set C-flag on match | SETC | 010100 | 20 |
| 7 | Set D-flag on match | SETD | 011000 | 24 |
| 8 | Set E-flag on match | SETE | 011010 | 26 |
| 9 | Set F-flag on match | SETF | 011100 | 28 |
| 10 | Write A-word | WRITEA | 010001 | 17 |
| 11 | Write B-word | WRITEB | 010011 | 19 |
| 12 | Write C-word | WRITEC | 010101 | 21 |
| 13 | Write D-word | WRITED | 011001 | 25 |
| 14 | Write E-word | WRITEE | 011011 | 27 |
| 15 | Write F-word | WRITEF | 011101 | 29 |
| 16 | Unlock write | UNLOCK | 010110 | 22 |
| 17 | Data word follows | DATAWORD | 011110 | 30 |
| 18 | Modulate on A match | MODA | 100000 | 32 |
| 19 | Modulate on B match | MODB | 100010 | 34 |
| 20 | Modulate on C match | MODC | 100100 | 36 |
| 21 | Modulate on D match | MODD | 101000 | 40 |
| 22 | Modulate on E match | MODE | 101010 | 42 |
| 23 | Modulate on F match | MODF | 101100 | 44 |

TABLE 1-continued

| Line No. | Instruction/Function | Mnemonic | Binary Value | Decimal Value |
|---|---|---|---|---|
| 24 | Unconditional modulate | MODALL | 100110 | 38 |
| 25 | Modulate on AB match | MODAB | 100001 | 33 |
| 26 | Modulate on ABC match | MODABC | 100011 | 35 |
| 27 | Modulate on ABCD match | MODABCD | 100101 | 37 |
| 28 | Modulate on ABCDE match | MODABCDE | 101001 | 41 |
| 29 | Modulate on ABCDEF match | MODABCDEF | 101011 | 43 |
| 30 | Modulate on any match | MODANY | 101110 | 46 |
| 31 | Reset | RESET | 111111 | 63 |

Table 1 lists in its first column by line number the 31 functions making up the instruction set used with a BIC 30. A second colb, ran is the functional description of the instruction. A third column gives the mnemonic used to refer to the instruction. A fourth column gives a 6-bit binary word for the instruction. This is the bit-word that is serially transmitted to the badge from the I/R 12. Note in particular that in this listing in column four the most significant bit (MSB) is given first and the least significant bit (LSB) given last. A last (fifth) column gives a decimal equivalent of the binary code.

The instructions fall into two major groups—those that are commands to the BIC 30 that require no response and those that are of the form of questions to the BIC 30 and which may produce a response. The latter are referred to as modulate-commands. All modulate-commands have a decimal value $\geq 32$, in other words, the MSB of the binary word is always a "1".

The following is a description of the functions of the various instructions listed in Table 1.

Line 31, Reset (RESET): The Reset command is used to initially power-up the BIC 30 from its normal quiescent state. A reset operation within the BIC 30 occurs when it comes within range of the beam 16 and then receives at least six "1's" in a row, whether they are all part of one word (111111) or split between two adjacent words (e.g., 010011, 111100). Thus six successive "1's" are never transmitted except as part of a RESET instruction. The Reset function is also responsible for initializing the BIC 30 bit and word clocks in order to synchronize the 6-bit instruction separator (word synchronization) with the incoming serial bit stream. This is accomplished by always transmitting a "0" as the LSB of the next word following a Reset instruction. The bit patterns of the remaining 30 instructions (other than RESET) have been assigned to ensure that the Reset condition (six or more adjacent "1's") cannot occur due to any sequential combination of instructions.

Line 23, Unconditional Modulate (MODALL): This command causes the BIC 30 to immediately turn on the modulator block 56 and thereby respond to the I/R unit 12. The command is used by the I/R unit 12 to simply test for the presence or absence of a badge 14.

Line 17, Data Word Follows (DATAWORD): This command instructs the BIC 30 to treat the next word received by it as a data value rather than as an instruction. Thus, after receiving this command, the next six bits received by the BIC 30 are stored in a data register to be used for subsequent comparison operations with the ID code registers of the BIC 30. The data word that follows can be any value from 0 to 62. A value of 63 (111111) will invoke a reset operation and therefore can never be used as data.

Line 30, Modulate on Any Match (MODANY): This command causes the BIC 30 to compare the contents of its data register with each of the six ID codeword registers that will be referred to as registers A through F. The modulator block 56 is turned on if there is at least one match. MODANY is used in a first pass of a search algorithm to quickly find out which data values (from 0 to 62) are present in any of the six 6-bit-wide codewords of a badge 14.

Lines 18–23:
  Modulate on A-Match (MODA):
  Modulate on B-Match (MODB):
  Modulate on C-Match (MODC):
  Modulate on D-Match (MODD):
  Modulate on E-Match (MODE):
  Modulate on F-Match (MODF):

Commands in this group cause the BIC 30 to activate the modulator block 56 only if the value in the data register matches the particular code register (A–F) specified by the command. For example, if the BIC 30's ID code memory registers (A through F) contain the values 12-15-30-15-45-27 and the data register is loaded with the value 15, then the MODA, MODC, MODE, and MODF commands produce no response while the MODB and MODD commands both produce a "yes" response. These commands are used in conjunction with the MODANY command in the first pass of the search algorithm. A response to MODANY tells the I/R unit 12 only that the current data value is present in some BIC 30's ID code; the I/R unit 12 then sends each of the MODA–F commands to determine exactly which register matches the data value.

Lines 4–9:
  SET A-Flag (SETA):
  SET B-Flag (SETB):
  SET C-Flag (SETC):
  SET D-Flag (SETD):
  SET E-Flag (SETE):
  SET F-Flag (SETF):

Each command in this group sets a corresponding electronic "flag" (latch) in the BIC 30 if the value in the data register matches the corresponding ID codeword. For example, if the A-word of the ID code is 45, the command sequence DATAWORD, 45, SETA sets the A-word match-flag. This flag remains set regardless of which instructions follow unless a subsequent SETA command causes it to change. These commands allow the BIC 30 to "remember" that particular ID code registers have previously been matched. The I/R unit 12 can then change the contents of the data register and check for combinations of matches (see below). The SETA-F commands are also used as part of the ID code programming sequence (see below).

Lines 25–29:
  Modulate on AB Match (MODAB):
  Modulate on ABC Match (MODABC):
  Modulate on ABCD Match (MODABCD):
  Modulate on ABCDE Match (MODABCDE):
  Modulate on ABCDEF Match (MODABCDEF):

These commands cause the BIC 30 to respond to multiple ID code register matches. MODAB activates the modulator block 56 (FIG. 3) if both the A-flag and the B-flag are set. If this occurs, the I/R unit 12 then "knows" the first 12 bits (words A and B) of a badge's 36 bit ID code. MODABC evokes a response if the A-, B-, and C-flags are set, in effect telling the I/R unit 12 that it has the first 18 bits of the ID code. MODABCD, MODABCDE, and MODABCDEF all work similarly. Note that when the BIC 30 gives a "yes" response to the MODABCDEF command, the I/R unit 12 has completely determined the BIC 30's 36 bit ID code.

Line 1, Power-Down on Match (POWERDOWN): This command is used to selectively turn off a badge 14 that has been identified, i.e., all of its match-flags have been set. The badge 14 is then inhibited from responding to all subsequent commands. This is necessary during a second pass of a search algorithm (described hereinafter) in order to resolve simultaneous responses from multiple badges 14. This command even inhibits the RESET command within the BIC 30, keeping the identified badge 14 inactive, (while it is in range of the RF field of the I/R unit 12) in order to prevent multiple interrogations. Without this reset-inhibit function a badge 14 would be interrogated/identified numerous times per second, which would hinder system performance. This would also lessen battery life if the badge 14 were left within range of an I/R unit 12 for prolonged periods. The reset circuit of the BIC 30 is re-enabled to detect a RESET command once the BIC 30 times-out, i.e., stops detecting RF pulses of a beam 16 for about 150 micro-seconds.

Line 2, Unconditional Power-Down (PDOWNNOW): This command immediately powers down the BIC 30, and this inhibits further command decoding. In other respects it is similar to the POWERDOWN instruction. Line 3, Lock Write (LOCK):

Line 16, Unlock Write (UNLOCK):
These commands are used during the ID code programming sequence for a BIC 30; UNLOCK is issued at the beginning of the sequence and LOCK is sent just before the end of the sequence.

Lines 10–15:
Write A-Word (WRITEA):
Write B-Word (WRITEB):
Write C-Word (WRITEC):
Write D-Word (WRITED):
Write E-Word (WRITEE):
Write F-Word (WRITEF):

These commands are used during the ID code programming sequence. Each command specifies which codeword register of the BIC 30 will be affected by the actual write operation.

"No-Ops" (NOP2, NOP4, NOP8) instructions which are used but not shown in Table 1:
These commands (000010, 000100 and 001000) produce no operations in the BIC 30. Actually, any bit sequence not represented by any other command described above is also a No-Op, but these three are explicitly defined as such. No-Ops are used to avoid certain illegal command sequences described below, and for this reason it is advantageous to use No-Op commands with zero's in the upper and lower bit positions.

Illegal Command Constraints: Due to the nature of the logic design of the BIC 30, certain command combinations will not produce the expected results and should be avoided. The conditions under which these circumstances arise are described below.

(1) A Reset will occur any time six consecutive "1's" are detected by the BIC 30. The Reset operation (and frame or word synchronization) does not actually occur until the first "0"-bit is detected after the RESET string of six "1's". Therefore, if the command immediately following a RESET contains one or more "1's" in the least significant bits, they will not be properly decoded and erroneous word framing will result. This is avoided by ensuring that the command following RESET always has a "0" in the LSB (any even-valued command). Any No-Op command is suitable for this purpose.

(2) Although the command codes (other than RESET) have been designed to avoid transmission of six sequential "1's" (which might cause an inadvertent Reset), care must also be taken with the command following the transmission of a data value. Note that the DATAWORD command (line 17 of Table 1) has "0's" in bits 1 and 6 in order to break a stream of "1's" because the subsequent data word may have a number of adjacent "1's" in the upper or lower bit positions (since a data word can have any decimal value from 0 to 62). However, the command following the data value itself could produce an inadvertent reset if the upper bits of the data value were "1's" and lower bits of the next command were also "1's". For example, if the decimal value 62 is sent as data (111110) and if the following command has a "1" in its least significant bit(s), the BIC 30 will see a Reset (six successive "1's"). This condition is avoided by always following data values with a command that has a zero in its least significant bit (any even-valued command). Any of the No-0p commands is suitable for this purpose.

(3) Because of practical considerations (cost, complexity, etc.), the modulator block 56 of the BIC 30 is not activated for two modulate commands in a row. Therefore, the command after any modulate command should never have a "1" in the sixth bit (MSB). Thus, a modulate command (any of lines 18–30 of Table 1) is always followed by a No-Op command.

In FIGS. 4A, 4B and 4C, there is shown schematically how the beam 16 of the I/R unit 12 is keyed on and off to transmit different coded instructions and data words. Increasing time is indicated along the horizontal axis to the right. FIG. 4A shows the beam 16 being keyed on and off with approximately a 50% on, 50% off duty cycle, to produce 6 binary "1's". This represents the "Reset" command, line 31 of Table 1. The least significant bit (LSB) of any 6-bit word is always transmitted first, and the most significant bit (MSB) last. The decimal equivalent of the 6-"1's" binary word RESET is "63". FIG. 4B illustrates the binary word 001110, which is the "lock" instruction, line 3 of Table 1. FIG. 4C shows the MODAB instruction of line 25 of Table 1. It is noted that the 6-bit word here is 100001 and that the MSB of this instruction is an extended "1" bit. All "modulate" instructions (lines 18–30 of Table 1) have an extended "1" bit in the MSB position. Briefly stated however, the extended "1" MSB in any MOD instruction permits the BIC 30 to respond to the I/R 12 (when response is appropriate) by modulating the antenna 32 of the badge 14 during a timed portion of an extended "1" MSB. All of the instructions listed in Table 1, and other binary words (not shown), are transmitted via the beam 16 in the ways illustrated in FIGS. 4A, 4B and 4C. Time durations of the "1's" and "0's", by way of example, are as follows. Each binary "0" is represented by a burst of the beam 16 lasting approximately 250 nanoseconds, and each binary "1" (not an extended "1") by a burst lasting about 2 micro-seconds. An extended "1" is a burst of the beam 16 lasting about 25 to 30 micro-seconds. The six binary bits of a word are spaced in time by about 4 micro-seconds from the beginning (time on) of one bit to the beginning of the next bit. Thus for a frequency of the beam 16 of 915 MHz, there are about 230 sinusoidal oscillations of the carrier wave in a binary "0", which, as will be explained hereinafter, is sufficient for the detection by the BIC 30 of a "0" bit. The number of carrier oscillations in a binary "1" is proportionally greater making detection even more positive at very low power levels.

The operation of the ID code search procedure used by the I/R unit 12 in conjunction with one or more badges 14 is as follows. The search method consists of two iterative loops or passes. The first pass determines which 6-bit-wide words of the complete 36-bit ID code (words A, B, C, D, E and F) are present in a badge 14 or badges 14. If at least one value is found for each of the six code words, then the second pass attempts to sort out all possible combinations that could result from multiple badges responding simultaneously. The entire process takes place as follows.

First Pass:

Step 1. The I/R unit 12 issues RESET commands to wake-up the unidentified badges 14, then uses the unconditional modulate command to determine if there is at least one unidentified badge 14 in the area:

RESET
NOP
MODALL

If a response from a badge 14 is detected, continue to Step 2, otherwise try again. Note that previously identified badges 14 still within range of the beam 16 may have been powered-down via previous POWERDOWN or PDOWNNOW commands. These identified badges 14 may be in the area but do not respond due to the reset-inhibit nature of these commands, as was previously explained.

Step 2. Since at least one badge 14 has been detected, the I/R unit 12 now determines which 6-bit codeword fragments are present. This is performed by sending a data "value" and checking if it matches any codeword of any badge 14:

Loop for data value one by one, 0 to 62:
DATAWORD
send data value
MODANY

If no response by a BIC 30, increment value and try again.

If a match is found, the I/R unit 12 determines which codeword register(s) of the BIC or BICS 30 contain(s) the match. Each time a register match is detected, the I/R unit 12 and the BIC 30 must retain which data value caused the match and with which register. To do this, let Awords be an array for storing values that match A-word registers, let Bwords store B-word matches, etc., through Fwords. Also, let Na be the number of A-word matches found, Nb the number of B-word matches found, etc. through Nf. All Nx's are initially zero. Then, each time a response to MODANY is detected in the above loop of Step 2, the I/R 12 performs the following:

NOP
MODA
If response detected then Awords (Na)=value, increment Na.
NOP
MODB
If response detected then Bwords (Nb)=value, increment Nb.
NOP
MODC
If response detected then Cwords (Nc)=value, increment Nc.
NOP
MODD
If response detected then Dwords (Nd)=value, increment Nd.
NOP
MODE
If response detected then Ewords (Ne)=value, increment Ne.
NOP
MODF
If response detected then Fwords (Nf)=value, increment Nf.

Once all data values from 0 to 62 have been tried, the loop is terminated and the first pass of the search algorithm is complete. At this point, the I/R unit 12 now knows which data values are present in which codeword registers. By way of example, this can be represented by the following Table 2, where the X's indicate responses of the BIC or BICS 30 to the MODA-MODF commands.

TABLE 2

| Value | A-Word | B-Word | C-Word | D-Word | E-Word | F-Word |
|---|---|---|---|---|---|---|
| 3 |  | X |  |  |  |  |
| 12 |  |  |  | X |  | X |
| 20 | X |  |  |  |  |  |
| 21 |  |  | X | X |  |  |
| 34 |  |  |  |  | X |  |
| 47 | X |  |  |  |  |  |
| 52 |  |  |  |  |  | X |

As illustrated by Table 2, the I/R unit 12 has detected the seven numbers 3, 12, 20, 21, 34, 47 and 52 present in the respective A–F registers of at least two badges 14. But there may be more than two badges 14 in this particular example. From the above Table 2 any of the following ID codes could be present in as many as eight badges 14 as shown by the possible combinations listed in the following Table 3.

TABLE 3

| A-Word | B-Word | C-Word | D-Word | E-Word | F-Word |
|---|---|---|---|---|---|
| 20 | 3 | 21 | 12 | 34 | 12 |
| 20 | 3 | 21 | 12 | 34 | 52 |
| 20 | 3 | 21 | 21 | 34 | 12 |
| 20 | 3 | 21 | 21 | 34 | 52 |
| 47 | 3 | 21 | 12 | 34 | 12 |
| 47 | 3 | 21 | 12 | 34 | 52 |
| 47 | 3 | 21 | 21 | 34 | 12 |
| 47 | 3 | 21 | 21 | 34 | 52 |

Note that at least one response is required for each of the codeword registers A–F. If this is not the case, the search can be halted. This could occur if a badge 14 has an illegal codeword value (namely 63) or if the badge is located in a fringe area of detection and is responding intermittently.

Second Pass:

A second pass of the search algorithm now attempts to sort out the possible combinations of known register values.

This is accomplished by looking for matches involving combinations of codewords using the SetFlag commands (lines 4–9 of Table 1) and the multiple-register-match modulate commands (lines 25–29 of Table 1).

First, the I/R 12 sends a known A-word and issues the Set A-Flag command. This will affect at least one badge 14. The I/R 12 sends a known B-word and the Set B-Flag (which will also affect at least one badge). Then the I/R 12 issues the MODAB command. If no response is detected, the I/R 12 then tries a new A-word and starts over. If a response is detected, the I/R 12 now knows the first 12 bits of an ID code (words A and B).

The search is continued by sending a known C-word followed by SETC and MODABC. If no response, the next known C-word is tested. If a response is detected, then 18 bits are now known and so on.

This process of building up the ID code by sending known codewords and checking for multiple register matches continues until a MODABCDEF command (line 29 of Table 1) yields a response, at which time a particular badge 14 is identified. This is performed as follows:

```
Loop for a = 1 to Na:
DATAWORD
Awords(a)
SETA
Loop for b = 1 to Nb
    DATAWORD
    Bwords (b)
    SETB
    MODAB
    If no response, try next Bword. If no Bwords,   try next
Aword. Otherwise:
        .Loop for c = 1 to Nc
        DATAWORD
        Cwords (c)
        SETC
        MODABC
        If no response, try next Cword. If no
Cwords, try next Bword. Otherwise:
            Loop for d = 1 to Nd
            DATAWORD
            Dwords (d)
            SETD
            MODABCD
            If no response, try next Dword. If
            no Dwords, try next Cword. Otherwise:
                Loop for e = 1 to Ne
                DATAWORD
                Ewords (e)
                SETE
                MODABCDE
                If no response, try next Eword.
                If no Ewords try next D word.
            Otherwise:
                    Loop for f = 1 to Nf
                    DATAWORD
                    Fwords (f)
                    SETF
                    MODABCDEF
                    If response, badge is identified.
                    Send POWERDOWN. If no response,
                    try next Fword. If no Fwords
                    try next Eword.
```

Once a badge 14 responds to the MODABCDEF command, it is selectively turned off via the Power-Down-on-Match command (POWERDOWN) and no longer responds to any subsequent commands. When all the loops have been completed, all of possible badge code combinations have been tried and, presumably, all badges have been identified.

In practice, even if one search sequence fails due to noise or range limitations producing garbled commands or erroneous responses, another search is performed so quickly (within milliseconds), that persons having the badges 14 do not realize there is a delay.

The above described method of search works even if multiple badges 14 are present in the detection area at the same time, provided each badge has a unique ID code. This is accomplished by:

a) The nature of the search algorithm to rapidly and efficiently examine all possible combinations of ID code words.

b) The ability to selectively turn off a particular badge one it has been identified.

c) The ability to inhibit the wake-up command (RESET) in an identified badge 14 as long as the badge is in effective range of the RF field of the I/R unit 12.

Together, these three features of the I/I system 10 ensure that all badges 14 within the interrogation area are uniquely identified very rapidly (within milliseconds).

An example of a complete search sequence for identifying two different badges 14 is given below. The badges are assumed to have only A, B, C words in their ID codes. Additional D, E, F words have been omitted for the sake of brevity. It is to be understood however that the search is easily extended to handle the D, E, F words of a badge's ID code. A first badge 14 with the A, B, C words "1", "2", "3" and a second badge 14 with the A, B, C words "10", "20", "30" are assumed present. The search sequence by the I/R unit 12, and the responses of the two badges 14 are given in an Appendix which is provided at the end of the specification.

The time required for the search sequence shown in the appendix is very short. For example, with signals having times and durations such as illustrated in FIGS. 4A, 4B and 4C, both passes of this search sequence are completed in only a few milliseconds. For a search sequence involving multiple badges 14, each having for example, six 6-bit ID code words (A–F), the total time is increased, but is still less than about 20 milliseconds. It will be appreciated that the search method provided by this aspect of the invention is highly efficient and very rapid compared to a search of all of the possible ID numbers of the badges 14 which proceeds serially one number to the next from the decimal value "0" through the decimal equivalent of 36 binary bits (well over 60 billion). Moreover, neither the badges 14 nor the I/R unit 12 during the above I/I sequence ever transmits a complete ID number per se. The I/I system 10 thus inherently provides a high degree of code security.

It will be seen that during the first pass of the above described search sequence, all of the badges 14 which are present are permitted to respond separately or together during a modulate command (e.g., MODALL). However, once a particular badge 14 has been identified as having a match of all of its code word fragments (e.g., words A, B, C, etc.) in the respective memory registers, only that badge 14 responds to certain commands (e.g., final all-word MATCH and POWERDOWN) from the I/R unit 12 even though other badges 14 are still present. The other badges 14 (those not yet identified or those previously identified and in a "power-down" state) do not respond at this time to the I/R unit 12. As was explained previously, each badge 14 is uniquely identified as to its ID code and only it uniquely communicates with the I/R unit 12 at the appropriate instant in the search sequence. This is an important feature of the invention.

Figure 5A:
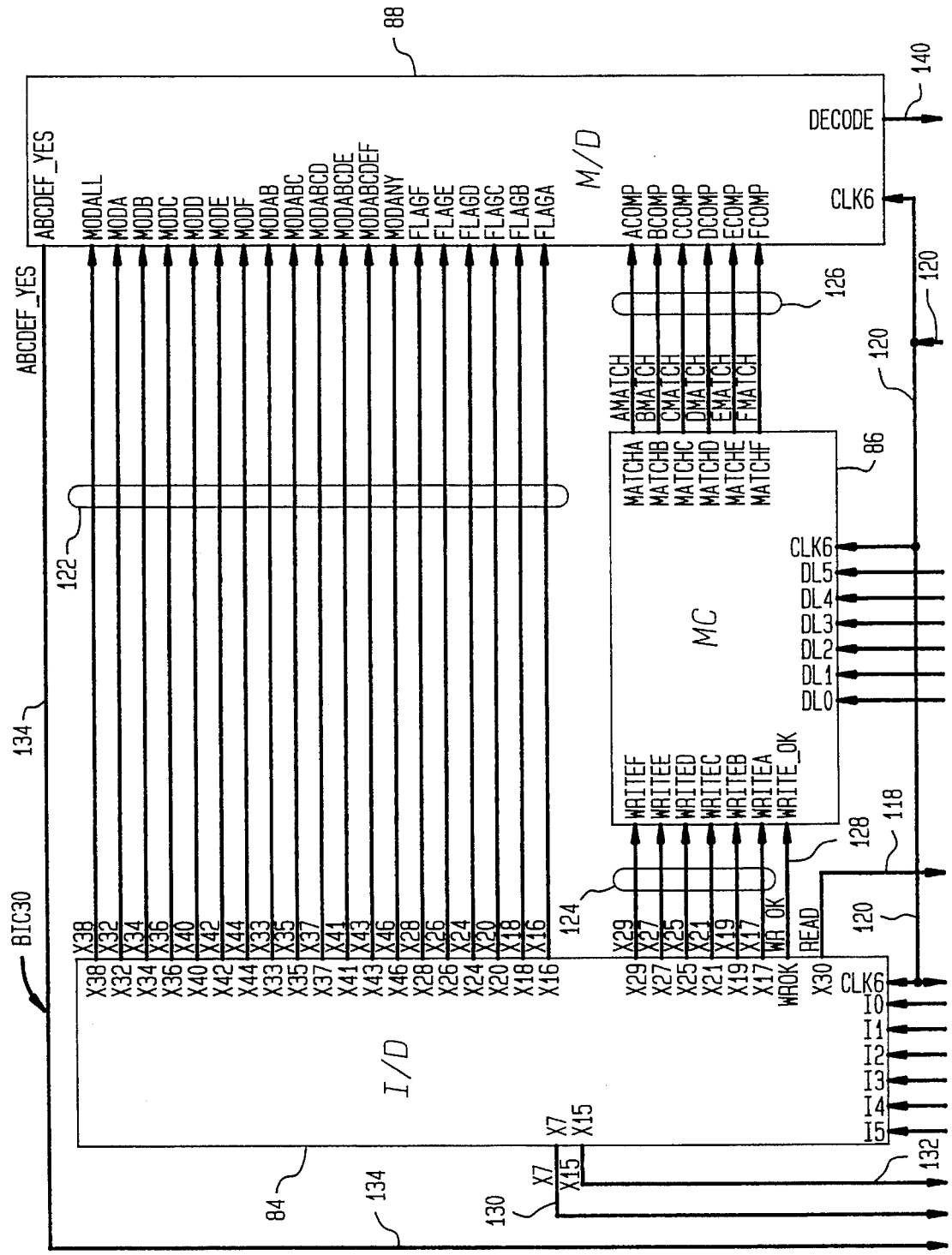
FIG. 5 is a detailed schematic diagram of the electronic circuitry of a badge.
Figure 5B:
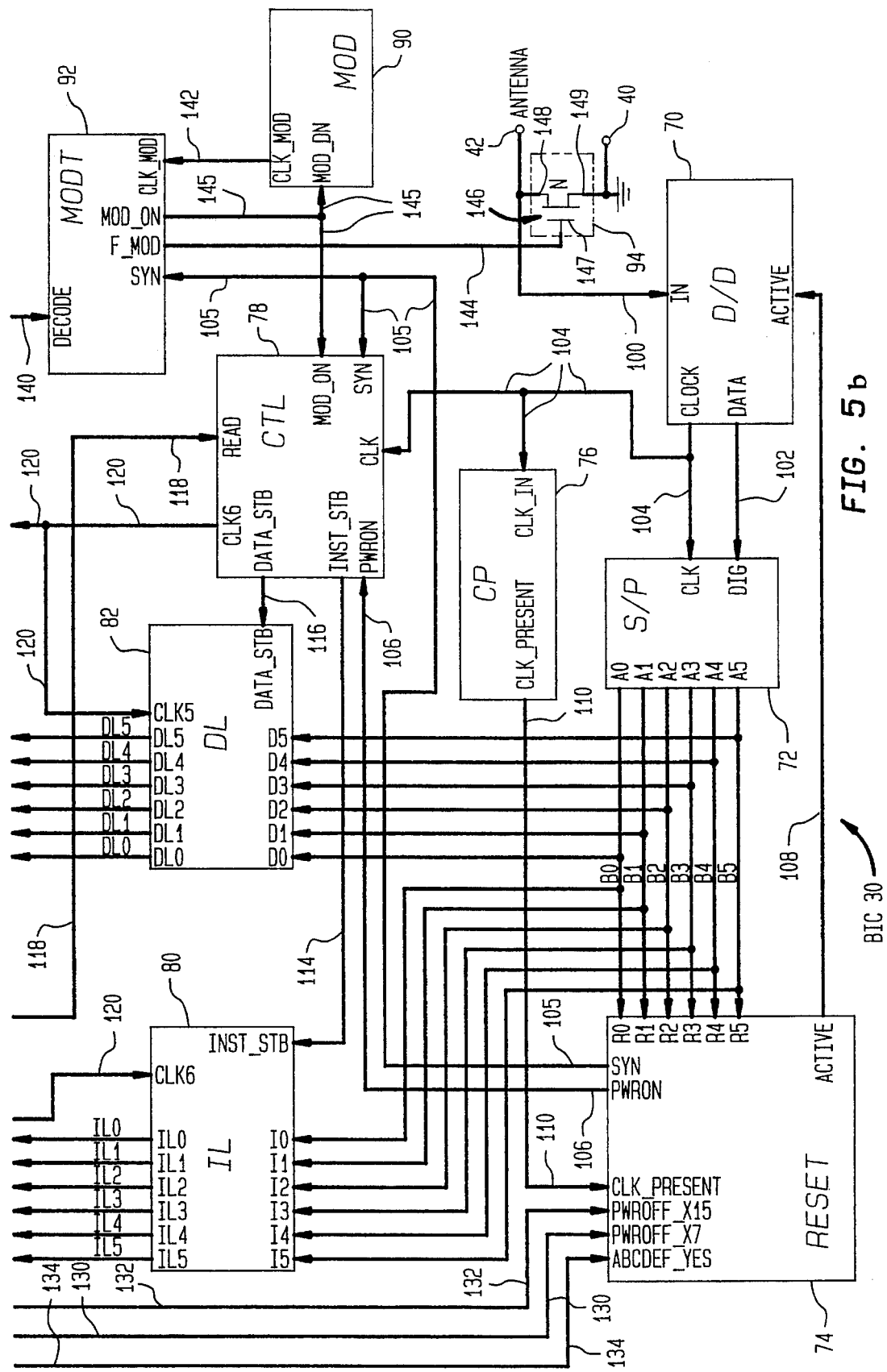

In FIG. 5, there is shown (on two sheets of drawing) a more detailed schematic circuit diagram for the BIC 30 than the abbreviated diagram described previously (FIG. 3). The BIC 30 comprises a pair of antenna input terminals 40 and 42 (seen at the lower right), a detector/demodulator (D/D) unit 70, a serial-to-parallel (S/P) data unit 72, a reset unit 74, a dock-present (C/P) unit 76, a control (CTL) unit 78, an instruction latch (IL) unit 80, a data latch (DL) unit 82, an instruction decode (I/D) unit 84, a memory comparator (MC) unit 86, a modulate decode (M/D) unit 88, a modulator (MOD) unit 90, a modulate-timer (MODT) unit 92, and a variable impedance unit 94 (shown within a dashed line rectangle) connected across the antenna input terminals 40 and 42.

When the BIC 30 (and its respective badge 14) is initially brought into effective range of an RF field of the beam 16 from the I/R unit 12 (FIGS. 1 and 3), the BIC 30 is in a quiescent state. Most of the circuitry of the BIC 30 when in quiescent state draws practically no current (e.g., leakage current less than 0.1 micro-ampere). However, the D/D unit 70, which is connected to the antenna input terminal 42 by a very short lead 100 remains on and able to detect low level RF pulses of the beam 16. Even so the total quiescent current of the BIC 30, by way of example, is only about 0.5 microampere. Individual circuit elements of and the unique mode of operation of the D/D unit 70 are described in detail hereinafter. Briefly stated however, the D/D unit 70 detects RF pulses of the beam 16 (such as illustrated in FIGS. 4A, 4B and 4C) and converts (demodulates) them into serial bit word sequences of binary "1's" and "0's". The D/D 70 also generates clock pulses which enable the BIC 30 to synchronize its operation with the 6-bit instruction and data words (Table 1) transmitted to the BIC 30 from the I/R unit 12. These are important features of the invention.

The D/D 70 applies via a data lead 102 the demodulated serial bit sequences of "1's" and "0's" to the S/P unit 72. The D/D unit 70 applies clock pulses via a common lead 104 to the S/P unit 72, and also to the CP unit 76 and the CTL unit 78. After the 6-bits of a word via the lead 102 have been serially clocked into the S/P unit 72, it applies the 6-bits in parallel at output terminals "A0" through "A5" of the S/P unit 72 to respective ones of the six common data lines labeled "B0" through "B5". These data lines apply the respective parallel data bits of each word to inputs "R0" through "R5" of the reset unit 74, to inputs "I0" through "I5" of the IL unit 80 and to inputs "D0" through "D5" of the DL unit 82. The reset unit 74 responds only to an instruction where six successive "1's" (i.e., a RESET command of line 31 of Table 1) are applied to its inputs "R0" through "R5". The reset unit 74 does not respond to all of the other 6-bit words which have one or more "0" bits, as was explained previously. When the reset unit 74 sees a RESET command (111111), the unit 74 applies to its output labeled "syn" via a common lead 105, a single synchronizing pulse to a "syn" input of the CTL unit 78 and to a "syn" input of MODT unit 92. This synchronizing pulse from the reset unit 74 via the lead 105 insures that the serial and parallel bit streams in the BIC 30 are properly "framed", that is, divided into and recognized as the respective 6-bit words (e.g., the instructions such as listed in Table 1 given above) being sent from the I/R unit 12. The reset unit 74 at the same time it applies a synchronizing pulse "syn" to the lead 105, also applies to its output labeled "pwron" a control voltage which is applied via a lead 106 to a "pwron" input of the CTL unit 78. This "enables" the CTL unit 78. Also at the same time that the reset unit 74 applies a control voltage at its "poweron" output to the lead 106, the reset unit 74 applies a control voltage from its output labeled "active" via a lead 108 to a respective input of the D/D unit 70. As will be explained hereinafter, the voltage on the lead 108 enhances the response of the D/D unit 70, and remains "true" until a "powerdown" command is received or until shortly after the BIC 30 is removed from range of the beam 16. The reset unit 74 receives at an input labeled "clk-present" a control signal via a lead 110 from the CP unit 76. So long as clock pulses via the lead 104 are applied to the CP unit 76, indicating that the D/D unit 70 is still receiving and demodulating signals from the beam 16, the "clk-present" control signal on the lead 110 is true. After about a 150 micro-second absence of clock signals to the CP unit 76, the unit "times-out" and the control signal on the lead 110 goes "false". This returns the reset unit 74 (and the BIC 30) to its quiescent state. Only after this happens can the reset unit 74 (and the BIC 30) be again "reset" (waked-up) by a subsequent RESET command from the I/R unit 12. RESET commands received while the clock-present signal on the lead 110 is "true" have no effect on the reset unit 74 (and the BIC 30). This arrangement, as explained previously, prevents the BIC 30, once it has been identified, from continuing to respond after a "powerdown" command from the I/R unit 12 and so long as the BIC remains in range of the beam 16.

The CTL unit 78, once activated by a "pwron" signal via the lead 106, controls the entering of 6-bit instruction commands into the IL unit 80 and the entering of 6-bit data values into the DL unit 82. The CTL unit 78 applies, via a lead 114, a control signal (identified as "INST_STB") to the IL unit 80, and applies, via a lead 116, a control signal (identified as "DATA_STB") to the DL unit 82. When the control signal on the lead 114 is true, the signal on the lead 116 is false, and only the IL unit 80 is enabled to input the 6-bit words applied to its respective inputs "I0" through "I5". When the signal on the lead 116 is true, the signal on the lead 114 is false, and only the DL unit 82 is enabled to input the 6-bit words applied to its respective inputs "D0" through "D5". The control signal on the lead 116 from the CTL unit 78 is true only after a "read" signal (resulting from a DATAWORD command) is applied via a lead 118 to a "read" input of the CTL unit 78. Thereafter, the control signal on the lead 114 goes true and the IL unit 80 is again enabled. The CTL unit 78 at an output "CLK6" thereof applies, via a common lead 120, a clocking or framing pulse (for each 6-bit word) to an input CLK6 of the IL unit 80, an input CLK6 of the DL unit 82, an input CLK6 of the I/D unit 84, an input CLK6 of the M/C unit 86, and to an input CLK6 of the M/D unit 88. The CTL unit 78 will be described in greater detail hereinafter.

The parallel 6-bit instruction words are applied from the IL unit 80 via respective leads "IL0" through "IL5" to the I/D unit 84. Similarly, the 6-bit data words are applied from the DL unit 82 via the respective leads "DL0" through "DL5" to the MC unit 86. When a 6-bit instruction word is entered into the I/D unit 84, the word is decoded and a corresponding output of the unit 84 is enabled. For ease in understanding the operation of the BIC 30 and the dynamic functioning of its units, the various outputs and interconnections of the I/D unit 84, the MC unit 86 and the M/D unit 88 are identified by the decimal equivalent of the respective instructions as listed in Table 1 given above. Thus the output "X7" of the I/D unit 84 corresponds to the instruction POWERDOWN as listed on line 1 of Table 1, output "X15" corresponds to instruction POWERDOWNNOW, and so on. There are nineteen leads 122 respectively identified as 122 (X38), etc., connecting the I/D unit 84 to the M/D unit 88. There are six leads 124 respectively identified as 124 (X29), etc., connecting the I/D unit 84 to the MC unit 86, and six leads 126 respectively identified as 126 (A match), etc., connecting the MC unit 86 to the M/D unit 88. The LOCK and UNLOCK commands when decoded by the I/D unit 84 appear at the output labeled "WROK" which is connected via a lead 128 to the MC unit 86. A command signal (powerdown) at the output "X7" of the I/D unit 84 is applied via a lead 130 to a first "pwroff-X7" input of the reset unit 74, and a command signal (powerdownnow) at the output "X15" of the I/D unit 84 is applied via a lead 132 to a second "pwroff_X15" input of the reset unit 74. When the reset unit 74 receives a true signal via a lead 134 from the M/D unit 88, (indicating an A, B, C, D, E and F match of an ID number) and a command on the lead 130, the reset unit 74 will "powerdown" the BIC 30. In the "powerdown" state, the BIC 30 draws only very little more current than when in its quiescent state. Moreover, in the "powerdown" state, the BIC 30 is inhibited from responding to any commands (including RESET) from the I/R unit 12 so long as the BIC 30 remains within range of the beam 16 and the CP unit 76 has not "timed-out".

When a data "word" is presented in the DL unit 82, that word is compared one by one with the ID "word" A through F stored in respective memory positions in the MC unit 86, in accordance with the first pass of the search sequence previously described. When a match with one of the words A–F is found, a corresponding "match" signal is applied via one of the leads 126 to a respective one of the inputs "A comp" through "F comp" of the M/D unit 88. Then on the second pass of the search sequence, the respective flags A–F in the M/D unit 88 are set on command via one of the leads 122 from the I/D unit 84.

When the I/D unit 84 applies the modulate commands (e.g., MODALL, X38) via a respective one of the leads 122 to the M/D unit 88, this unit at its output labeled "decode" applies via a lead 140 a control signal to the MODT unit 92. This unit is driven by a signal of suitable frequency (e.g., 5 MHz) applied to it via a lead 142 from the MOD unit 90. When the MODT unit 92 is enabled by the "decode" signal on the lead 140 from the M/D unit 88, the MODT unit 92 applies, at an output "FMOD" via a lead 144, a modulating signal lasting a short precise interval to the variable impedance unit 94 shown within a dashed line box. The MODT unit 92 when on also applies a "MOD_ON" signal via a common lead 145 to the CTL unit 78 and to the MOD unit 90 telling these units that modulation is in progress. The variable impedance unit 94 comprises an n-channel field effect transistor (FET) 146 whose gate 147 is connected to the lead 144, whose drain 148 is connected to the antenna lead 100 and there through to terminal 42, and whose source 149 is connected to ground and to terminal 40. While the gate 147 of the FET 146 is modulated by the modulating signal from the MODT unit 92, the impedance of the FET 146 is substantially varied at a suitable frequency (e.g., 5 MHz). This modulates the impedance of the badge antenna 32 (see FIGS. 2 and 3), as was explained previously, and this reflects back a signal using part of the microwave energy being transmitted from the I/R unit 12 as an "extended MSB" bit (FIG. 4c). A readily detected, reflected signal of carrier frequency with sidebands (e.g., 915 MHz plus and minus 5 MHz) from the badge antenna 32 is represented by the RF beam 70 (FIG. 3). The other modulate commands (Table 1) when applied by the I/D unit 84 to the M/D unit 88 produce a similar result.

As was mentioned previously, the ID words A–F can be remotely written into the BIC 30. They are electronically stored in the MC unit 86. The integrity of the ID code stored within the BIC 30 is of utmost importance. To maintain code security, it is effectively impossible to alter the stored ID code except via an authorized programming sequence. Also, since the ID code is field-programmable, precautions are needed to prevent unintentional programming. Any time the BIC 30 detects incoming bits, other than via proper reception of the bitstream transmitted by the interrogator, a potential for ID code loss exists. One occasion for this to occur takes place when a badge 14 is at the range of the beam 16. Any bit that is missed by the D/D unit 70 causes subsequent instructions to become out of sync. The garbled bit pattern then conceivably could result in a change or loss in the stored ID code. This situation can be more generally approached by considering the effects of random noise. If random noise were interpreted by the BIC 30 as a random input stream of "1's" and "0's", then presumably given enough time, a command sequence to effect code programming could occur. To guard against this happening and to reduce the chance of ID code loss to a vanishingly small probability, the algorithm required to program an ID code requires the transmission of a suitable number of command words in a very specific sequence. If any error in the sequence occurs, the BIC 30 automatically generates an internal reset. One possible sequence is as follows:

(1) Send the Write-Unlock command (line 16, Table 1)

(2) Send each of the six Set-Match-Flag commands (lines 4–9 of Table 1) one or more times in some sequence or other commands in a fixed sequence (3) Send the desired Write-Word command (e.g., one of lines 10–15 of Table 1) a suitable number of times (4) Send the Write-Lock command (line 3 of Table 1)

(5) Send the Write-Word command again

After executing Step 5, the value in the data register of DL unit 82 will be copied to the memory register of the MC unit 86 specified by the particular Write-Word command.

By way of example, the command sequence to program the data value "23" (010111) into the B-word position of the ID code is:

| DATAWORD |
| --- |
| 23 |
| UNLOCK |
| SETA |
| SETB |
| SETC |
| SETD |
| SETE |
| SETF |
| WRITEB |
| . |
| . |
| WRITEB |
| LOCK |
| WRITEB |

On receipt of the last WRITEB command, the B-word ID code register of the MC unit 86 will change to "23". No other registers are affected. The sequence continues in this way to program all of the words of the ID code into the BIC 30.

Figure 6A:
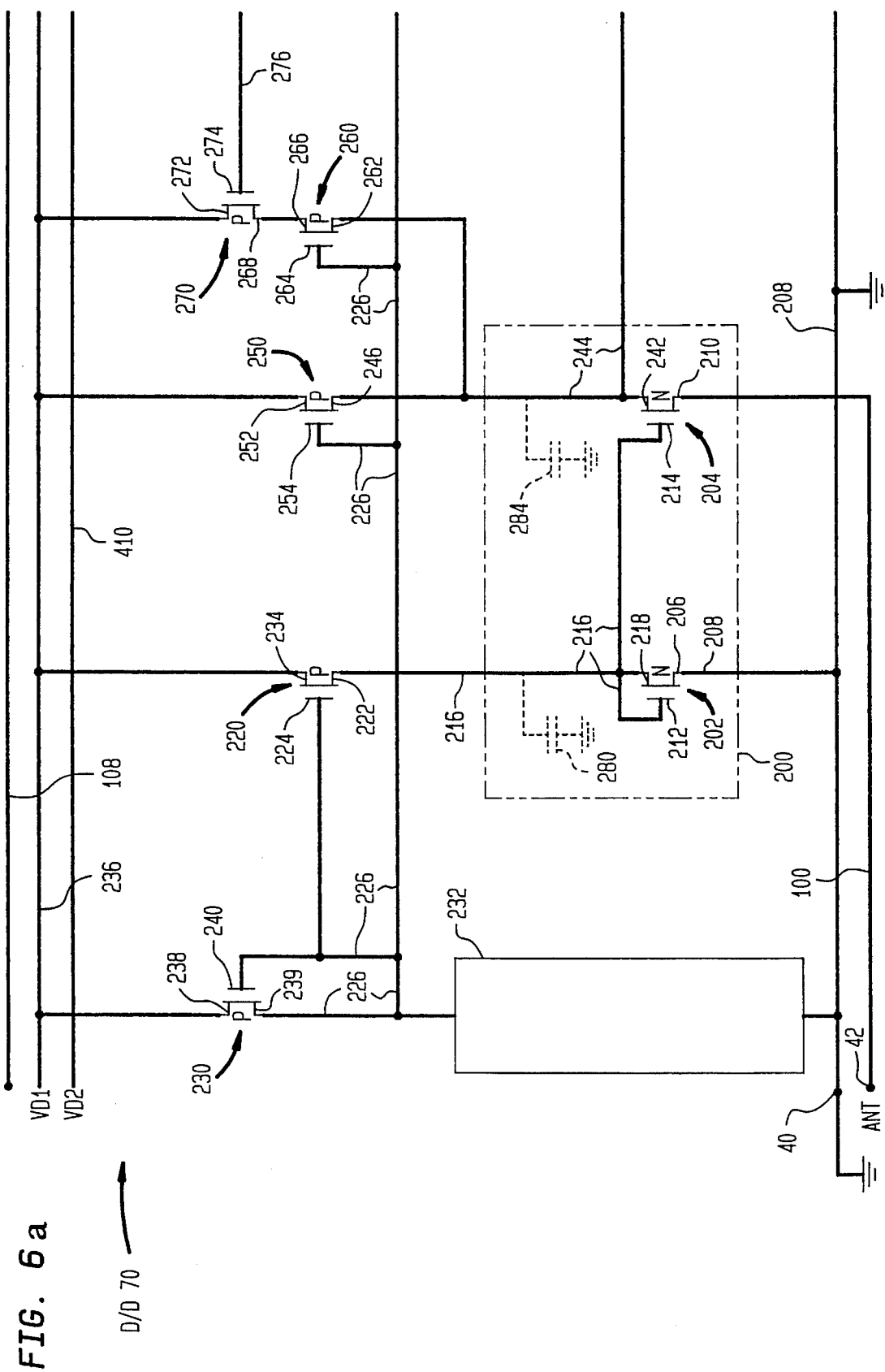
FIG. 6 is an electronic circuit diagram showing transistors and other elements of a D/D unit.
Figure 6B:
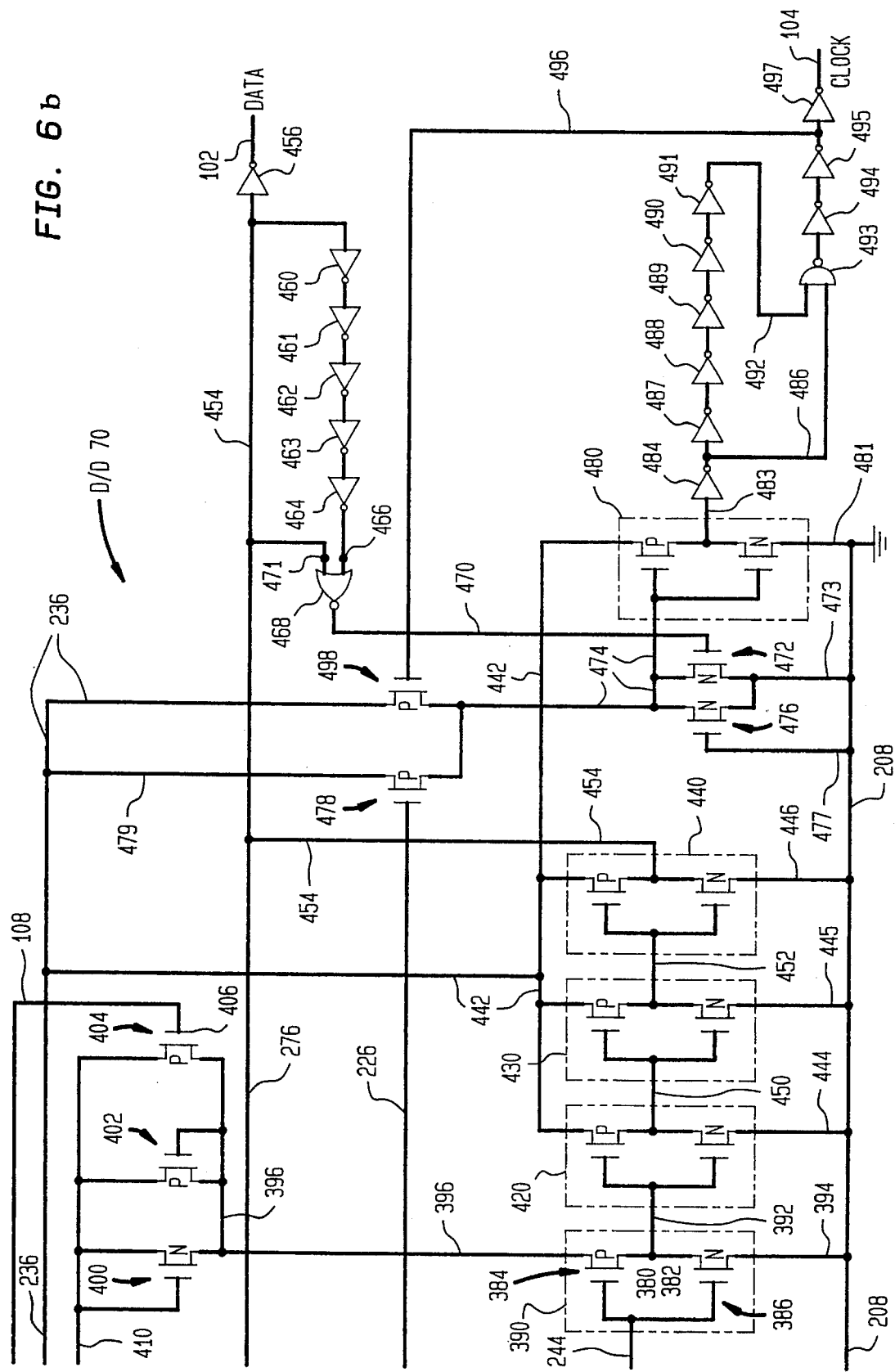

Referring now to FIG. 6 (presented on sheets 1 and 2), there is shown a detailed circuit diagram of the D/D unit 70 in accordance with the features of the present invention. The sizes of the various elements (e.g., transistors) and the lengths of the various lead lines and node connections are shown greatly exaggerated for the sake of illustration. It is to be understood however that circuit 70 is advantageously implemented using CMOS technology. Those skilled in the art will appreciate that CMOS circuitry is normally considered unsuitable as being far too slow in response for use in detecting/demodulating microwave signals. However in accordance with an important aspect of the invention, CMOS elements of the circuit of the D/D unit 70 are arranged as a highly efficient, very sensitive detector/demodulator for a microwave signal such as represented by the beam 16.

As seen at the lower left of FIG. 6 (sheet 1), the ground antenna terminal 40 is connected to circuit ground and the other antenna terminal 42 is connected to the lead 100 (see also FIG. 5). The antenna 32 (see FIG. 2) is not shown in FIG. 6. The lead 100 applies RF signals (such as in FIGS. 4A, 4B and 4C) to an input stage 200, (shown within a dashed-line box). The stage 200 comprises a first n-channel FET 202 and a second n-channel FET 204 connected as a common-gate, source-driven amplifier. A source 206 of the FET 202 is connected to a circuit ground lead 208 (negative rail), and a source 210 of the FET 210 is connected to the RF input lead 100. Respective gates 212 and 214 of the FETs 202 and 204 are connected together to a common lead 216 which is also connected to a drain 218 of the FET 202. Current is supplied to the lead 216 (and the drain 218) from a first P-channel FET 220 whose drain 222 is connected to the lead 216 and which serves as a constant current source for the FET 202. The FET 220 has its gate 224 connected to a common lead 226 which is maintained at a suitable regulated and filtered direct voltage by a regulating transistor 230 and a high resistance load and filter 232 (implemented in MOS technology). The FET 220 has its source 234 connected to a first supply voltage lead 236 (positive rail) which in turn is connected to the positive terminal +VDD via the lead 48 to the battery 34 (not shown here but shown in FIG. 2). The transistor 230 also has its source 238 connected to the positive supply lead 236, and the drain 239 of the transistor 230 is connected to the common lead 226 and to the load 232. The gate 240 of the transistor 230 is connected to the common lead 226. The regulating transistor 230 and the load 232 serve as a current mirror for determining the current through the transistor 220.

In a similar way, the FET 204 has its drain 242 connected to a common lead 244 which is connected to the drain 246 of a second p-channel FET 250 connected as a constant current source. This FET 250 has its source 252 connected to the positive lead 236, and its gate 254 connected to the common lead 226. As with the FET 220, FET 250 has its current determined by the current mirror arrangement formed by the transistor 230 and the load 232. By way of example, the width of the regulating transistor 230 is chosen to give current flow through the transistor 230 of about 0.1 micro-ampere. The width of the gate of the first FET 220 is made twice as large as that of the transistor 230 so that the regulated current through the transistor 220 is twice as large (e.g., about 0.2 microampere) as through the transistor 230. The width of the gate of the FET 250 is made about 20% greater than that of the FET 220 for a reason explained hereinafter. In addition to the FET 250, there is a third p-channel FET 260 whose drain 262 is connected to the common lead 244. The gate 264 of the FET 260 is connected to the common lead 226, and its source 266 is connected to the drain 268 of a p-channel control FET 270 whose source 272 is connected to the positive lead 236. The FET 270 is normally off (open circuit), its gate 274 being controlled by signals applied to it from a lead 276.

In the fabrication of the FET 202 and 204, they are made as nearly equal as possible and of a size to have optimum response yet low current drain. By way of example, each of the FETs 202 and 204 has a gate 40 microns wide. The second FET 250 however is made approximately 20% wider than the FET 220 so that the transistor 250 draws approximately 20% more current under the same conditions of gate bias and supply voltages. As a result the normal stand-by (quiescent state) voltage on the common lead 244 is higher than the corresponding voltage on the common lead 216. By way of example, the voltage on the lead 244 may be about +2.2 V (for a battery voltage of +V) and the voltage on the lead 216 about +1 V.

There are small stray capacitances between circuit ground and elements (e.g., source, drain electrodes) of the FETs 202 and 204 and the FETs 220 and 250. Two of these capacitances are indicated by the dotted lines as a capacitor 280 connected between the lead 216 and ground, and a capacitor 284 connected between the lead 244 and ground. These capacitors, as will be explained presently, play an important role in the operation of the input stage 200. By way of example, the capacitor 280 is roughly 75 femtofarads (ff), and capacitor 284 roughly 120 ff And with no RF voltage applied to antenna terminal 42 (which is at D.C. ground) the voltage across the capacitor 280 is about +1 V, and the voltage across the capacitor 284 is about +2.2 V. The input stage 200 is thus deliberately unbalanced to this extent (by making the FET 250 slightly larger than the FET 220), as was explained previously. The transistors and logic circuitry of FIG. 6, second sheet, will be described below after a discussion of FIGS. 7 and 8.

Figure 7:
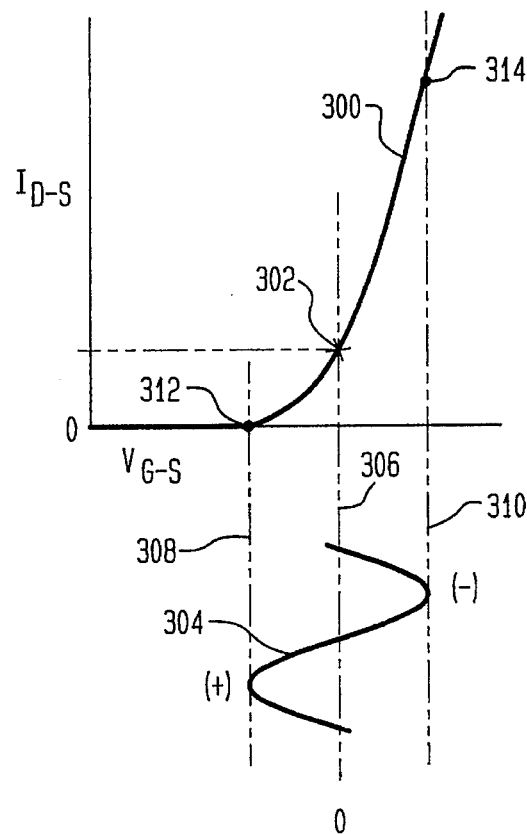
FIG. 7 is a current and voltage diagram showing schematically the operation of a portion of the D/D unit of FIG. 6.

In FIG. 7, a current-voltage diagram illustrates the operation of the FET 204 of the input stage 200. Transistor current I between drain and source is indicated by the vertical axis, and the gate to source bias voltage V is indicated along the horizontal axis. A curve 300 shows the non-linear relationship between current I and voltage V at very low values of drain to source current. For a gate to source bias voltage indicated at a point 302 near the knee of the curve 300 the corresponding current I is very low (e.g., roughly 0.2 microampere) and will vary substantially non-linearly in accordance with the curve 300 as the gate-to-source voltage V is varied about the point 302. By way of example, the voltage at the point 302 is set at about +1 V relative to ground (in the absence of an incoming signal applied to the lead 100 of FIG. 6). The capacitors 280 and 284 (see FIG. 6) which are small (femtofarads), are normally thought to be of secondary concern as having insignificant effect at the low frequencies (e.g., several megahertz) at which CMOS circuits are considered to be suitable. However at microwave frequencies, the capacitors 280 and 284 do have an effect.

One cycle of a sinusoidal voltage wave 304 (representing one cycle of the RF carrier of the beam 16) is shown plotted along a vertically aligned zero axis 306 which intersects the bias point 302. The voltage wave 304, by way of example, oscillates from the zero axis 306 to a positive peak (+) indicated by the vertical dashed line 308 and thence to a negative peak (−) indicated by the vertical dashed line 310. The dashed line 308 intersects the curve 300 at a point 312 and the dashed line 310 intersects the curve 300 and a point 314. Thus a cycle of oscillation in voltage wave 304 results in non-linear excursions along the curve 300 in the drain to source current I (of the FET 204) between the point 312 (practically zero current) and the point 314 where the current I is substantially greater than the current I at the bias point 302. It should be understood that the amplitude of the voltage wave 304 may be less than that illustrated. By way of example, not more than about 10 millivolts amplitude of the voltage wave 304 is enough to provide for efficient operation of the input stage 200.

With each cycle of the voltage wave 304, a small incremental amount of electrical charge is drawn from the capacitor 284 resulting in a slight drop in the voltage stored on this capacitor 284. By way of example, the voltage on the capacitor 284 (and the common lead 244) is about +2.2 V (in the absence of an RF input signal on the lead 100). But when the RF signal of the beam 16 appears on the lead 100 and oscillates at very high frequency (see for example FIG. 4A), the charge on the capacitor 284 is incrementally "pumped" down each cycle in the way just described. During this time the charge and voltage across the capacitor 280 remain approximately constant (e.g., at about +1 V).

Figure 8:
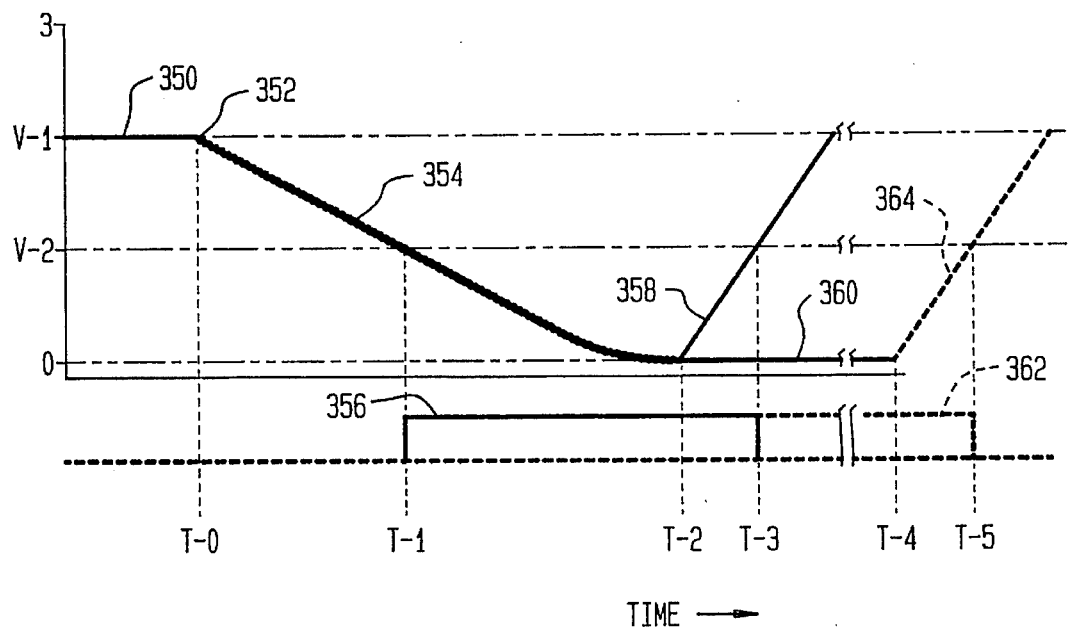
FIG. 8 is a voltage and time diagram further illustrating the operation of a portion of the D/I) unit of FIG. 6.

Referring now to FIG. 8, there is shown a graph with voltage V across the capacitor 284 (and the common lead 244) along the vertical axis and with time along the horizontal axis. Following the example given above of a battery voltage of ±volts, a short horizontal line segment 350 at a voltage V-1 illustrates the voltage maintained across the capacitor 284 prior to the appearance of a microwave signal from the beam 16 on the lead 100. Beginning at a point 352, representing a time T-0, an RF voltage appears on the input lead 100 and the voltage across the capacitor 284 is "pumped" down (in the way previously described) in a series of small incremental steps illustrated by the downward sloping line 354. When the voltage falls below a value V-2 at a time T-1, a voltage-switching event (to be described in detail hereinafter) occurs. This is illustrated here by a step-wave 356 which begins at time T-1 and continues in proportion to the duration of a binary "0" or "1" of the beam 16, as will be described shortly. By way of example, roughly 100 cycles (wave 304) of the beam 16 are sufficient to pump down the charge on the capacitor 284 to the voltage level V-2. As the charge across the capacitor 284 continues to be "pumped" down, the voltage across the capacitor 284 continues down along the line 354 and asymptotes toward zero where it remains for so long as a microwave voltage (wave 304) is applied to the input lead 100. In the event that the beam 16 is on only long enough to represent a binary "0" (see for example the LSB "0" of FIG. 4B), the charge "pumping" action described above no longer continues after a short time (e.g., 250 nanoseconds) and the voltage across the capacitor 284 begins a return, at a time indicated at T-2, along a line 358 to its initial value V-1. The upward slope of the line 358 is determined by the charging of the capacitor 284 which is provided by the second p-channel FET 250 augmented now by the FET 260 which is connected in circuit by turning on the FET 270. Thus the capacitor 284 is re-charged more rapidly to the voltage level V-1 by both FETs 250 and 260 together than by the FET 250 acting alone. Conversely, the charge on the capacitor 284 is pumped down from the level V-1 more quickly with the FET 260 disconnected by the FET 270 being "off". The FET 260 is in effect connected or disconnected in the circuit by the action of the control FET 270 which in turn is controlled by a signal on the lead 276. Thus by having the FET 260 disconnected (while the capacitor 284 is being pumped down), fewer "pumps" are required and the circuit responds more rapidly to the input beam 16. But with the FET 260 momentarily connected in circuit (the FET 270 then on), the voltage across the capacitor 284 re-charges more rapidly along the line 358 to the level V-1. Thus both the discharging (pumping down) and re-charging of the capacitor 284 are speeded up, and the operation of the input stage 200 is enhanced.

As the voltage across the capacitor 284 re-charges along the line 358, the level V-2 is reached and the step-wave 356 ends at a time indicated at T-3. The interval T-1 to T-3 indicates a binary "0" as will be explained hereinafter. On the other hand, if the beam 16 remains on for a time corresponding to a binary "1", which is much longer than a binary "0" (see FIG. 4C), the charge across the capacitor 284 will remain near zero as illustrated by the horizontal line segment 360 which continues beyond the time T-2. This line segment 360 (which is partially broken away) continues for a much longer duration than the interval T-0 to T-2 and ends at a time T-4 when the beam 16 momentarily turns off again. This represents either a binary "1" or an extended binary "1" of the beam 16 (see FIG. 4C). In both cases this condition is recognized as a binary "1". Of course when the voltage across the capacitor 284 continues along the line segment 360, rather than the upwardly sloping line 358, the stepwave 356 does not end at time T-3 (which would indicate a binary "0"), but continues as indicated by the dashed line 362 somewhat beyond the time T-4. At the time T-4 (at which the beam 16 is momentarily turned off until the next "bit"), the capacitor 284 now begins to re-charge along the dashed line 364 to the voltage level V-1. When the voltage reaches the level V-2, at a time indicated at T-5, the stepwave 356 (and its extension 362) ends. The duration T-1 to T-5 corresponds to a binary "1". The slope of the line 364 (i.e., the recharging rate of the capacitor 284) is the same as for the line 358.

In FIG. 6, the operation of the elements of the D/D unit 70 shown on sheet 1 of FIG. 6 has now been described. When an RF signal on the lead 100 appears, the charge on the capacitor 284 is "pumped" down until the voltage across the capacitor 284 and of the common lead 244 reaches the level V-2 (see FIG. 8) at a time T-1. As seen on sheet 2 of FIG. 6, the lead 244 is connected in common with the gates 380 and 382 of a p-channel FET 384 and an n-channel FET 386, respectively, which are connected as a first inverter amplifier stage 390 shown within a dashed-line box. The drains of the FETs 384 and 386 are connected in common with an output lead 392. The source of the FET 386 is connected by a lead 394 to the ground lead 208 (negative rail). The source of the FET 384 is connected by a lead 396 to a controlled positive voltage source comprising an n-channel FET connected as an n-channel field effect diode 400 with gate and drain in common, a p-channel FET connected as a p-channel field effect diode 402 with gate and drain in common, and a control P-channel FET 404 whose gate 406 is connected to the lead 108 from the reset unit 74 (FIG. 5). The drain of the FET 404 is connected to the lead 369, along with the "source" of the n-channel field effect diode 400 and the "drain" of the p-channel field effect diode 402. The source of the 404 is connected to a positive supply voltage lead 410, along with the "drain" of the n-channel field effect diode 400 and the "source" of the p-channel field effect diode 402. When the control FET 404 is "off", the voltage drop between the supply lead 410 and the lead 396 is determined by the lesser of the voltage drop across the n-channel field effect diode 400 or the p-channel field effect diode 402. Thus the voltage on the lead 396 (when the control transistor 404 is off) will be slightly less than the full supply voltage (e.g., about ±V). By way of example, the voltage on the lead 396 (when the D/D unit 70 is quiescent) is about +2.2 V. The advantage of this arrangement will be explained shortly. When the voltage on the common lead 244 is at V-1 (FIG. 8), the voltage on the output lead 392 of the first amplifier stage 390 is near ground (the negative rail) and the amplifier stage draws almost no current.

The first amplifier stage 390 is connected in series with three similar amplifier stages 420, 430, and 440, respectively, (all indicated by the separate dashed line boxes). Each of these amplifier stages 420, 430, and 440 has a p-channel FET and an n-channel FET connected together in a way substantially identical to the corresponding FETs 384 and 386 of the first stage 390. The second, third and fourth amplifier stages 420, 430 and 440 are connected via a common lead 442 to the supply lead 236 (positive rail) and by respective leads 444, 445 and 446 to the ground lead 208 (negative rail). The first amplifier stage 390 is connected to the second stage 420 by a lead 392; the second stage 420 is connected to the third stage 430 by a lead 450; and the third stage 430 is connected to the fourth stage 440 by a lead 452. The output of the fourth stage 440 is connected via a lead 454 to an input of a data output inverter amplifier 456 whose output is connected to the data lead 102. The lead 454 is also connected to the control lead 276 which extends to the gate 274 of the P-channel field effect control transistor 270 (sheet 1 of FIG. 6).

The lead 454 is also connected to an input of a first inverter amplifier 460 which is serially coupled to four other inverter amplifiers 461 through 464 which provide a small cumulative signal delay. The output of the inverter amplifier 464 is connected to a lower input 466 of a NOR gate 468 whose output is connected to a lead 470. An upper input 471 of the NOR gate 468 is connected directly to the lead 454. The lead 470 is connected to the gate of an n-channel FET 472 whose source is connected via a lead 473 to the ground lead 208 and whose drain is connected to a common lead 474. The source and drain of the FET 472 are also connected respectively to the source and drain of another n-channel FET 476 whose gate is connected via a lead 477 which is connected to the ground lead 208. The FET 476 serves as a small parasitic capacitor in this part of the circuit for a reason which will be explained hereinafter. Current is supplied to the lead 474 (and the transistor 472) by a p-channel FET 478 (similar to the FET 220) whose gate is connected to the lead 226, whose source is connected by a lead 479 to the supply voltage lead 236, and whose drain is connected to the common lead 474. The lead 474 is connected to the common-gate input of an inverter amplifier stage 480 (similar to the amplifier stage 420) shown within a dashed line box. The amplifier stage 480 is connected by a lead 481 to the ground lead 208 and by the lead 442 to the supply voltage lead 236. The output of the amplifier stage 480 is connected by a lead 483 to an inverter amplifier 484 whose output is connected to a lead 486 and to a series of five inverter amplifiers 487 through 491. An output of the inverter amplifier 491 is connected by a lead 492 to an upper input of a NAND gate 493. A lower input of the NAND gate 493 is connected to the lead 486, and its output is connected to an inverter amplifier 494 which in turn is connected to an input of an inverter amplifier 495. An output of the inverter amplifier 495 is connected to a lead 496 and to a final inverter amplifier 497, having an output which is connected to the "clock" lead 104 (FIG. 4). The lead 496 is connected to the gate of a p-channel control FET 498 whose source is connected to the supply voltage lead 236 and whose drain is connected to the common lead 474.

Even though the BIC 30 is in a quiescent state waiting to receive a reset (wake-up) command from the I/R unit 12, the D/D unit 70 nonetheless is partially on and fully able to detect any incoming signal of the beam 16. The input stage 200 of the D/D 70 is always awake and operates as described above. However until a "true" signal (a negative going voltage level) appears on the lead 108, the supply voltage applied to the first amplifier stage 390 by the lead 396 is somewhat less than the full battery voltage on the positive lead 410 as was previously explained. Lead 410 is separate from the other supply lead 236 in order to isolate switching noise. With a reduced supply voltage on the lead 396 to the first amplifier stage 390, and with the voltage on the lead 244 to the common gates of the stage 390 approximately equal to it (i.e., the voltage level V-1 of FIG. 8), the first stage 390 draws practically no standby current. When the voltage on the lead 244 (and the capacitor 284) drops to a value of V-2, the output lead 392 is switched from near zero to about the level of V-1. This causes the second amplifier stage 420 to switch its output lead 450 in voltage effectively from the positive rail to the negative rail, and so on with the third and fourth amplifier stages 430 and 440. Thus when the capacitor 284 is pumped down and the lead 244 goes negative to the level V-2 (FIG. 8), the output lead 454 of the fourth amplifier stage 440 is driven effectively from the positive rail to the negative rail. This switched voltage on the lead 454 is the inverse of the step-wave 356 (FIG. 8) which begins at a time T-1 and continues until T-3 to represent a binary "0", or continues until time T-5 to represent a binary "1", as was previously explained.

The width of the gate of the FET 384 and of the gate of the FET 386 of the first stage 390 are made as small as practical (e.g., about 3 microns wide) in order to provide as high an input impedance as possible. As previously mentioned, the FETs 202 and 204 of the input stage 200 have a gate width of about 40 microns and thus have a much lower impedance for driving the first amplifier stage 390. The widths of the gates of the transistors in the second, third and fourth amplifier stages 420, 430 and 440 are made progressively wider than the widths of the transistors of the first stage 390 to obtain high amplification and progressively lower impedance drive.

When the output lead 454 of the fourth stage 440 is driven from positive to negative, this step-wave is applied to the inverter amplifier 456 which in turn applies a "true" data signal (either a binary "0" or "1") to the lead 102. The negative going level on the lead 454 is also applied to the lead 276 and thence to the gate 274 of the control transistor 270. This, as explained previously, connects in circuit the FET 260 and causes the capacitor 284 to re-charge more rapidly along the upwardly sloping line 358 or the line 364 (FIG. 8) than without the added charging action of the FET 260.

When a reset signal is detected by the reset unit 74, it applies a true signal (negative going voltage) to the lead 108. This signal turns on the control FET 404 and effectively connects the lead 396 of the first amplifier stage 390 to the lead 410 (positive rail). This increases the drive capability of the first stage 390. While it also increases the average current drawn by the first stage 390 until a "powerdown" command is next received by the BIC 30, the time that the signal on the lead 108 is "true" is so short (e.g., only about a hundredth of a second) that the added power drain is negligible. The subsequent amplifier stages 420, 430 and 440, which have their inputs and outputs at either a positive or negative rail potential, draw virtually no current except when switching. As a result, the total current drawn by the D/D unit 70 over a time average is very low (e.g., less than about 0.5 microampere). The remainder of the BIC 30 when in quiescent (or in powerdown) state draws practically no current.

When a negative going signal from the fourth amplifier stage 440 is applied to the lead 454, the upper input 471 of the NOR gate 468 is driven negative. This applies a positive signal (of short duration) to the lead 470 which turns on the transistor 472 which in turn pulls the common lead 474 down to the negative rail potential. In the absence of a positive signal on the lead 470, the common lead 474 is at the positive rail potential. After a short delay provided by the five inverter amplifiers 460 through 464, the lower input 466 of the NOR gate 468 is driven negative which ends the positive going signal on the lead 470. A voltage and timing diagram showing these events is described hereinbelow.

When the common lead 474 goes negative by the transistor 472 turning on, the amplifier stage 480 drives its output lead 483 positive and the inverter amplifier 484 drives the lead 486 negative along with the lower input of the NAND gate 493. Since the level on the lead 492 connected to the upper input of the NAND gate 493 is already high, no output from the NAND gate 493 occurs at this time. As soon as the positive pulse on the lead 470 ends, the FET 472 turns off and the common lead 474 is pulled up at a controlled rate to the positive rail potential. The FET 476 acts as a parasitic capacitor as was previously explained, and controls the rate at which voltage increases on the common lead 474. When this voltage reaches a sufficiently high level, the amplifier stage 480 toggles and its output lead 483 is driven again to the negative rail. This causes the inverter amplifier 484 to apply a positive going signal to the lead 486 and to the lower input of the NAND gate 493. Since the level on the lead 492 is still high (by virtue of the short delay provided by the inverter amplifiers 487 through 491), the upper input of the NAND gate 493 will be high for a short time along with the level on the lower input of the NAND gate 493. Thus a short duration negative pulse is produced at the output of the NAND gate 493. This results in a positive clock pulse at the output of the inverter amplifier 497 and on the clock lead 104. A negative pulse is then also applied by the inverter amplifier 495 to the lead 496 which turns on the transistor 498 and rapidly pulls the common lead 474 all the way up to the positive rail potential. The voltage and timing relations of these events will now be described.

Figure 9B:
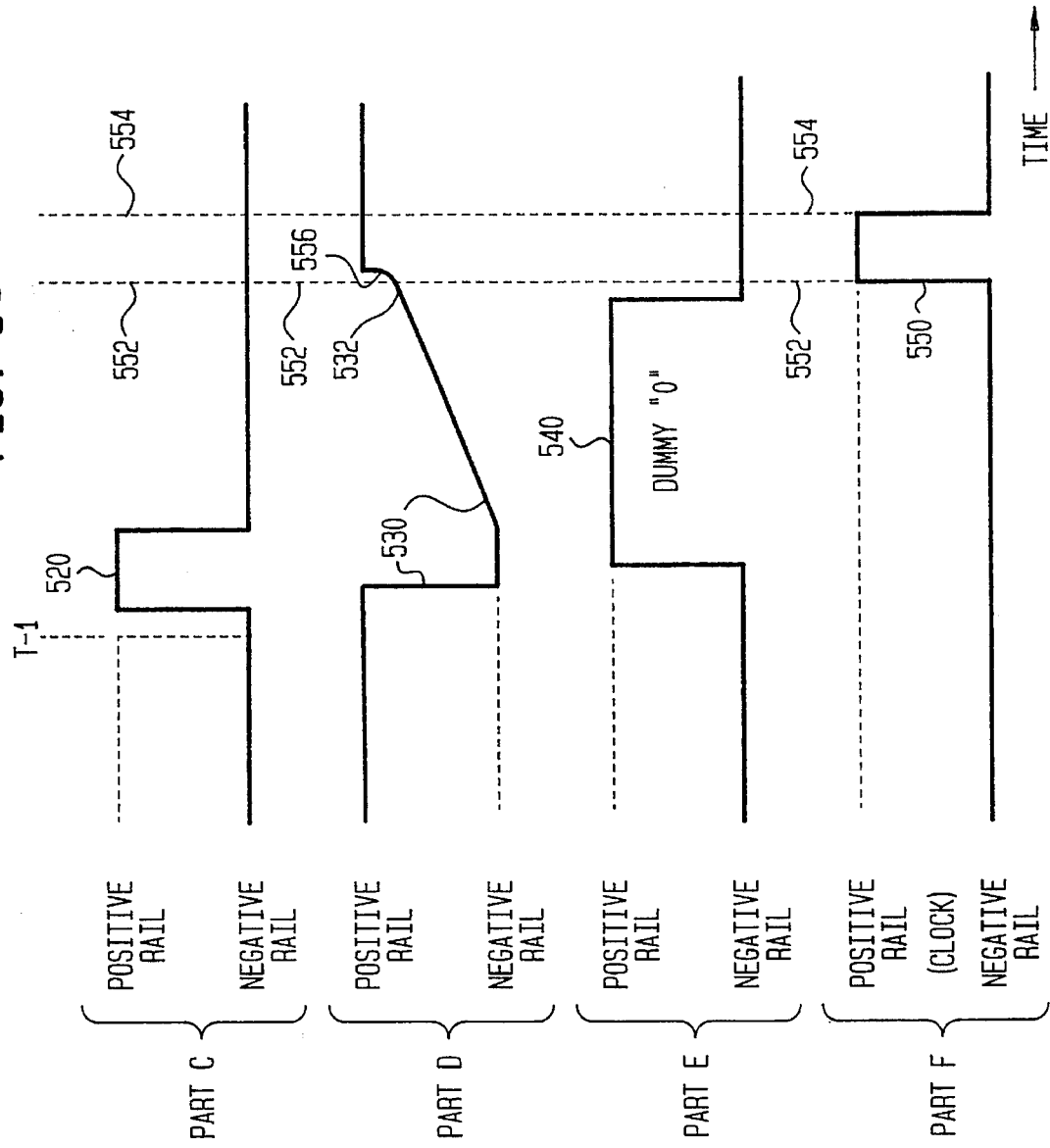
FIG. 9, parts A, B, C, D, E, F, show schematic diagrams of certain voltage and time relations within the circuitry of a badge.

Referring now to FIG. 9 (parts A, B, C, D, E and F), there are shown, not to scale and somewhat idealized, certain voltage and time relationships in the D/D unit 70. Voltage levels (positive and negative rails) are indicated along the vertical axis and time along the horizontal axis which is partially broken away. In FIG. 9, part A, the voltage level V-1 (see also FIG. 8) indicates the initial level of the common lead 244 of the input stage 200 in a quiescent state, as previously described. At a time T-0 an RF signal (FIG. 4) begins as indicated here by a horizontal wavy line 500 (indicating a binary "0"), or by a much longer wavy line 502 (indicating a binary "1" or an extended binary "1"). The voltage on the capacitor 284 and the lead 244, indicated here by the downward sloping line 504, is then pumped down in the way previously described (FIGS. 7 and 8). When a value V-2 is reached, the first amplifier stage 390 switches the polarity of its output lead 392 and in turn switches the second, third and fourth stages 420, 430 and 440. The voltage on the output lead 454 of the fourth stage 440 is here indicated by the wave form 506. This voltage switches very rapidly from the positive to the negative rail potential at a time indicated at T-1. If the RF signal is a binary "0", as indicated by the wavy line 500, it will end after a short duration (e.g., about 250 nanoseconds) at a time T-2 and the capacitor 284 (and the lead 244) re-charges along a line 505 to V-1, in the way previously explained. Thus at a time T-3 the voltage on the lead 454 (wave form 506) is switched from negative to positive rail potential. This voltage on the lead 454 is illustrated in FIG. 9, part B, as a wave form 510 here indicating a binary "0" which begins at a time T-1 and ends at T-3. It is noted that wave form 5 10 is the inverse of a binary data pulse on the output data lead 102.

If the RF signal to the input stage 200 is a binary "1" (or extended "1"), as indicated by the wavy line 502 of part A, the RF signal 502 continues for a considerable duration (e.g., at least about 2 microseconds) and ends as indicated at a time T-4. Shortly after this at a time T-5, the wave form 506 switches from the negative to the positive rail potential, as was explained previously. And instead of the wave form 510 (binary "0") indicated in part B, a wave form 512, indicated by the dashed lines, of much longer duration beginning at T-1 and ending at T-5, is generated. This represents a binary "1" (or extended "1").

In FIG. 9, part C, a short positive going wave form 520 occurs slightly after time T-1. The wave form 520 represents the voltage applied by the lead 470 to the gate of the FET 472. When the FET 472 turns on, the common lead 474 is pulled down to the negative rail potential, as indicated in FIG. 9, part D, by the wave form 530. Wave form 530 begins shortly after wave form 520 does, but lasts much longer because when the FET 472 is turned off, the voltage on the lead 474, which is across the FET 476 (connected as a parasitic capacitor), takes some time to return to the positive rail potential. As the wave form 530 slowly returns to the positive rail potential, at a level indicated at 532, the voltage on the common lead 474 becomes sufficiently positive to toggle the inverter amplifier stage 480 and switch its output lead 483 to the negative rail potential. The voltage on the output lead 483 is illustrated in part E by a wave form 540 which goes positive slightly after the wave form 530 goes negative, and which goes negative slightly after the wave form 530 reaches the voltage level (toggle point) 532. It is noted that the duration of the wave form 540 of part E (termed a dummy "0") is somewhat longer than the binary "0" wave form 510 of part B which extends from time T-1 to T-3. This somewhat longer duration of wave form 540 is obtained by making the gates of the FETs 472 and 476 somewhat wider than the gates of the FETs 202 and 204 of the input stage 200.

When the wave form 540 of FIG. 9, part E, goes negative (just slightly after the toggle point 532 of part D), a negative rail potential is again applied to the output lead 483. This in turn after a short delay produces a clock pulse on the clock lead 104, as was previously explained (PART 6). One such clock pulse 550 is illustrated in part F. The pulse 550 begins at a time indicated by the vertical dashed line 552 and ends at a time indicated by the vertical dashed line 554. It is noted that the dashed time line 552 occurs well after the time T-3 at which a binary "0" pulse of part B ends. However, the clock pulse 550 occurs during a binary "1" (or extended "1"). This time relationship of dock pulses 550 to binary "0's" and "1's" such as illustrated in part B, enables the various parts of the circuitry of the BIC 30 to recognize and discriminate between the binary "0's" and "1's" as they occur. A clock pulse 550 is generated each time a binary "0" or "1" (as illustrated in part B) occurs. It is further noted that at the beginning of the wave form 550 at the time line 552, a negative going pulse (not shown) is applied to the lead 496 which turns on the transistor 498 to quickly pull the common lead 474 up to positive rail potential. This action is indicated in FIG. 9, part D, slightly after the dashed time line 552, by the step portion 556 of the wave form 530.

In FIG. 10, (see also FIG. 5) the six data inputs "R0" through "R5" are connected to respective inputs of a NAND gate 602, whose output is connected to an input of an inverter amplifier 604, which in turn has an output connected to an input of a pulse-former 606. An output of the pulse former 606 is connected to an upper input 608 of a NAND gate 610 whose output is connected to an inverter amplifier 614. The output of the inverter amplifier 614 is connected to a lead 616 and to the output terminal identified as "SYN" to which the output lead 105 is connected. The input terminal "clk_present" from the lead 110 is connected to a common lead 618 which is connected to an upper input 620 of a NAND gate 622, to an input of an inverter amplifier 624, and to an input of a pulse former 626. The input terminal "pwroff-X7" from the lead 130 is connected to a lower input 628 of a NAND gate 630 whose upper input 632 is connected to the input terminal "ABCDEF_yes" and the lead 134. An output of the NAND gate 630 is connected via a lead 633 to an input of an inverter amplifier 634 whose output is connected to a pulse former 636. The output of the pulse former 636 is connected to an upper "set" input 638 of a set-reset flip-flop 640. The output of the pulse former 626 is connected to a lower "reset" input 642 of the flip-flop 640. The output of the flip-flop 640 is connected to an input of an inverter amplifier 644 having an the output which is connected via a lead 645 to a lower input 646 of the NAND gate 622, and to a lower input 647 of the NAND gate 610. The input terminal "pwroff-X15" from the lead 132 is connected to an input of an inverter amplifier 648 whose output is connected to a middle input 650 of a NAND gate 652. A lower input 654 of the NAND gate 652 is connected to the output of the NAND gate 630. The output of the inverter amplifier 624 is connected to a lower input 656 of a NAND gate 658 whose upper input 660 is connected to the lead 645. The output of the NAND gate 658 is connected to an upper input 662 of the NAND gate 652 whose output is connected to a pulse former 664. An output of the inverter amplifier 614, via a lead 616, is connected to an upper "set" input 666 of a set-reset flip-flop 668 whose output is connected to the output terminal "pwron" and the lead 106. The flip-flop 668 has a lower reset input 670 which is connected to an output of the pulse former 664.

The NAND gate 602 only responds to six binary "1's" (111111) of a reset command. When this occurs a positive pulse from the pulse former 606 is applied to the upper input 608 of the NAND gate 610. At the same time, the "clk-present" signal on the lead 110 is applied to the pulse former 626, thence to the reset input 642 of the flip-flop 640 and to the inverter amplifier 644 to produce a positive signal on the lead 645 and the lower input 647 of the NAND gate 610. This causes the NAND gate 610 through the inverter amplifier 614 to produce a positive synchronizing pulse at the output "syn" terminal and the lead 105. This synchronizing pulse serves as an initial marker in the framing of the binary signals into their respective 6-bit words, as was previously explained. The positive "clk_present" signal from the lead 110 is also applied via the common lead 618 to the upper input 620 of the NAND gate 622 whose lower input 646 is now also positive. Thus NAND gate 622 applies a negative going "true" signal to the "active" terminal and the lead 108. The pulse from the inverter amplifier 614 is also applied, via the lead 616, to the set input 666 of the flip-flop 668 which thereupon applies a positive going true signal at the "pwron" terminal to the lead 106. The signals produced at the output leads 105, 106 and 108 after a "reset" signal is received by the reset unit 74, "wake-up" the BIC 30 from its quiescent state.

When an "ABCDEF-yes" signal is applied to the lead 134, and a "power down" signal is applied to the lead 130 (as previously explained), positive going signals are applied for a short time to the inputs 628 and 632 of the NAND gate 630. Gate 630 in turn via the lead 633, the inverter amplifier 634 and the pulse former 636, applies a signal pulse to the set input 638 of the flip-flop 640 which causes the inverter amplifier 644 to apply a negative going signal to the common lead 645. The NAND gate 610 thereupon no longer responds to reset pulses applied to its input 608 by the NAND gate 602, and the NAND gate 622 no longer responds to the "clk_present" signal applied via the lead 618 to its upper input 620. This removes the "true" signal from the output terminal "active" and the lead 108. Until the "clk_present" signal is removed from the lead 110 (by the CP unit 76 timing-out a short time after the BIC 30 is removed from range of the beam 16), the reset unit 74 remains in the "power down" state just described, even though one or more reset commands are subsequently applied to the NAND gate 602. Later, after the "clk_present" signal is removed from the lead 110, the reset unit 74 automatically returns the BIC 30 to a quiescent state in which no signals are applied to the leads 105, 106 and 108 (PART 5). Removal of the "clk_present" signal causes the common lead 645 to be "reset" which applies a positive level to the upper input 660 of the NAND gate 658, a positive level from the inverter amplifier 624 also being applied at this time to the lower input 656. This causes the NAND gate 658 to apply a negative going level to the upper input 662 of the NAND gate 652 whose middle input 650 and lower input 654 are negative at this instant. Thereupon the output of the NAND gate 652 goes positive and the pulse former 664 applies a pulse to the reset input 670 of the flip-flop 668 which removes the "true" signal from the "pwron" terminal and the lead 106. An unconditional "pwroff-X15" signal from the lead 132 through the inverter amplifier 648 to the middle input 650 of the NAND gate 652 acts in a way similar to that of the signals "ABCDEF-yes" and "pwroff-X7".

In FIG. 11, (see also FIG. 5) the CTL unit 78 comprises a logic and counter module 700 which is connected via the common lead 120 to a switch module 702 as well as to other units of the BIC 30 (FIG. 5). The module 700 has its inputs "clk", "mod_on", "pwron" and "syn-pulse" connected to the leads 104, 145, 106 and 105, respectively. The output "clk 6" of the module 700 is connected to the common lead 120 and to a "clk 6" input of the switch module 702. A "read" input of the module 702 is connected to the lead 118. The "inst" output of the switch module 702 is connected to the instruction strobe lead 114, and the "data" output to the data strobe lead 116. When "clk", "pwron" and "syn" signals are applied via the leads 104, 106 and 105, to the module 700 it begins counting the input clock pulses (lead 104) and on every sixth clock pulse generates what is termed a "clock 6" (clk 6) pulse. This serves to properly frame the 6-bits of each of the respective binary words, as was explained previously. The "clk 6" pulses are applied to the switch module 702 and to other units of the BIC 30 as was explained previously. When a "read" signal is applied via the lead 118 to the switch module 702, it energizes its "data" output and applies a "true" signal to the lead 116 which causes data to be entered into the DL unit 82, as was previously explained. In the absence of a "read" signal on the lead 118, the switch module 702 at its output "inst" applies a "true" signal to the lead 114 instead of to the lead 116. This actuates the IL unit 80. When the MODT unit 92 is on (during an extended binary "1") and the BIC 30 is responding to the I/R unit 12, an inhibit signal is applied to the lead 145 and the "mod-on" input of the module 700. This temporarily inhibits the module 700 and prevents false actuation by noise during modulation by the BIC 30 of its antenna 32.

Figure 12:
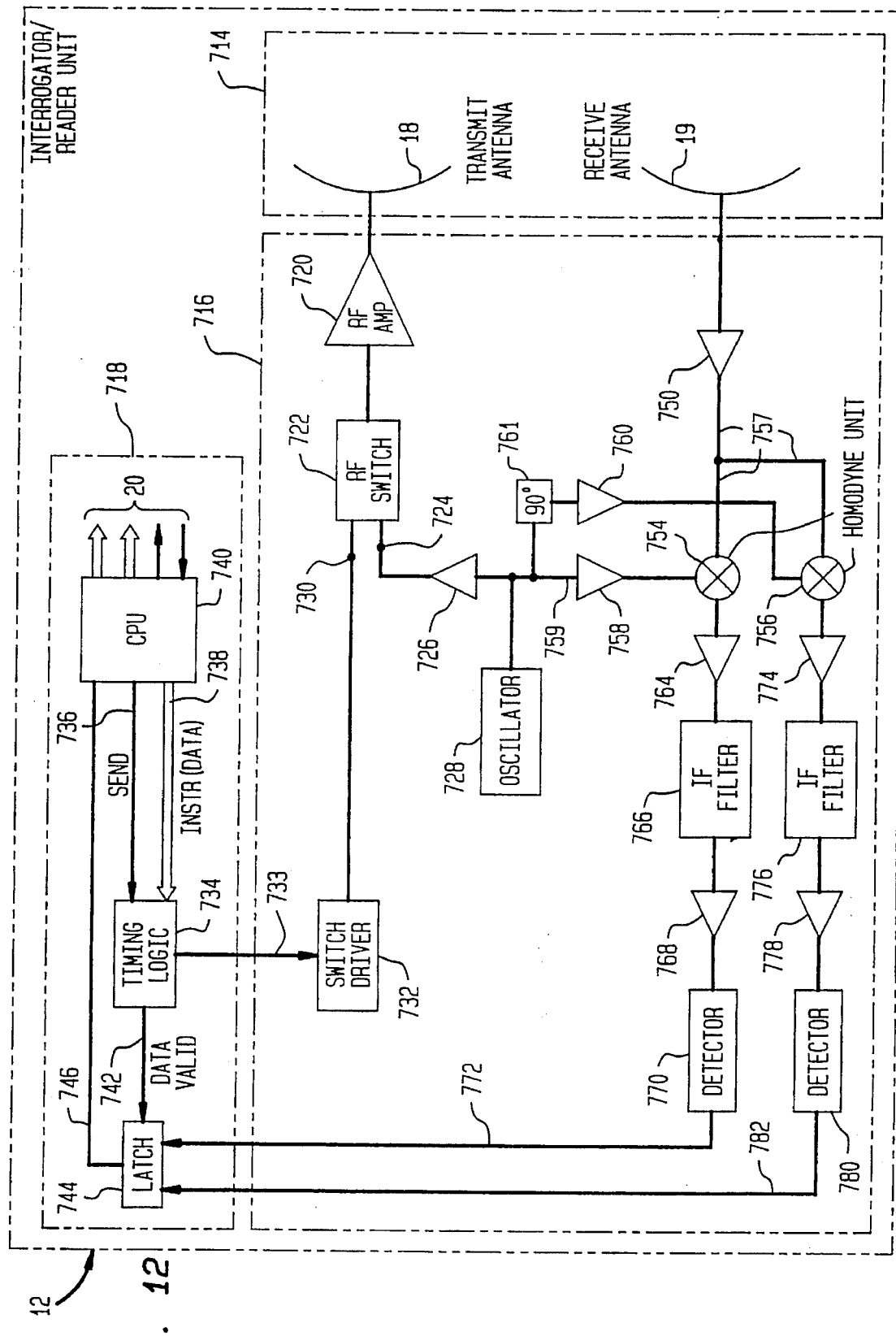
FIG. 12 is a schematic circuit diagram of the I/R unit.

In FIG. 12, the I/R unit 12 (shown within an overall dashed line rectangle) comprises an antenna section 714 (shown within a dashed line rectangle), an RF section 716 (shown within a dashed line rectangle), and a logic and control section 718 (shown within a dashed line rectangle). Connected to the transmit antenna 18 of antenna section 714 is an RF amplifier 720 which is driven by an RF switch 722 which is supplied at a lower input 724 thereof with a steady RF signal from an amplifier 726 and an oscillator 728 operating at a suitable microwave frequency (e.g., 915 MHz). The switch 722 at an upper input 730 thereof is turned on and off in accordance with control signals from a switch driver 732 which in turn is controlled via a lead 733 by a timing logic unit 734. The unit 734 receives transmit commands via a "send" lead 736 and data to be transmitted via an "instr (data)" buss 738 from a central processor unit (CPU) 740. The CPU 740 is connected via the cable 20 to the computer 22 (not shown here). The timing logic unit 734, via a "data valid" lead, enables a latch 744 which is connected via a lead 746 to the CPU 740.

Connected to the receive antenna 19 of section 714 is an input RF amplifier 750 whose output is connected via a common lead 752 to a first homodyne unit 754 and to a second homodyne unit 756. The first homodyne unit 754 is driven by an amplifier 758 whose input is connected via a lead 759 in phase to the oscillator 728. The second homodyne unit 756 is driven by an amplifier 760 whose input is connected via a phase-shifting unit 761 out of phase by 90° degrees to the oscillator 728. The output of the first homodyne unit 754 is connected to an input of an amplifier 764 which in turn is connected through an intermediate frequency (IF) filter 766 to an input of an amplifier 768. An output of the amplifier 768 is connected to an input of a detector 770 whose output is connected via a lead 772 to a first input of a latch 744. The output of the second homodyne unit 756 is similarly connected to an amplifier 774, an IF filter 776, an amplifier 778, a detector 780, and a lead 782 to a second input of the latch 744.

The CPU 740 (which is advantageously a commercially available microprocessor, such as an Intel Corp. part number 87C51FA) provides the memory and logic necessary to the interrogation and identification of the badges 14 in accordance with the instructions and data of the search sequence previously described. The CPU 740 controls the timing logic unit 734 which in turn controls the switch driver 732 and the RF switch 722. Thus microwave data signals (FIGS. 4A, 4B and 4C) are applied to the RF amplifier 720 and to the transmit antenna 18.

Modulated signals from the BIC 30 via the microwave beam 70 (FIG. 3) are received by the antenna 19, amplified by the amplifier 750 and fed to the first and second homodyne units 754 and 756 which are connected in a quadrature arrangement well known in the art. Thus depending on the phase of the signal received by the antenna 19 (relative to the phase of the oscillator 728), either the first or second homodyne unit 754 or 756 (or both units together) will apply an intermediate frequency signal (e.g., a 5 MHz signal) to the respective amplifier 764 and IF filter 766, and to the amplifier 774 and the IF filter 776. These intermediate frequency signals are respectively amplified in the amplifier 768 and detected in the detector 770, and in the amplifier 778 and the detector 780. The output of the detector 770 and of the detector 780 is a signal pulse corresponding in time and duration (though not in frequency) to the modulated response from the BIC 30 during an extended "1" bit (see FIG. 4C). The outputs of the detectors 770 and 780 are applied via the respective leads 772 and 782 to the latch 744. Assuming a signal has been applied to one or both inputs of the latch 744 (indicating a response from a badge 14) this signal on command to the latch 744 via the lead 742 is sent via the lead 746 to the CPU 740. When received by the CPU 740, the badge response signal in the latch 744 is processed and identified in accordance with the search sequence described previously. Communications to and from the CPU 740 via the cable 20 and the computer 22 provide badge identification, data formatting and programming software between the CPU 740 of each I/R unit 12 and the computer 22 in a way well known in the art.

The circuitry of the BIC 30 detects and demodulates the RF signals of the beam 16 with high sensitivity, accuracy and efficiency. No additional RF detector (such as a Schottky diode) is required even though the incoming signals are of microwave frequency. The BIC 30 generates its own clock and timing signals which are slaved to the incoming RF signal bit stream and hence the decoded instruction and data words (e.g., 6-bit words) are properly framed and accurately responded to. The embodiment of the BIC 30 which has been described is entirely implemented in CMOS technology as a single, low cost integrated circuit. No RF tuned circuits (other than the antenna 32) are required. By virtue of its structure and operation, the BIC 30 draws extremely low amounts of power both in its quiescent and in its active states. This results in long battery life even with a micro-size battery small enough to fit within the profile of an ID badge or similar tag. The circuity of the I/R unit 12 uses readily available components which are highly reliable in their performance and are cost effective. The operation of the I/I system 10 is extremely fast and accurate; it is essentially fail-safe. Because of the sensitivity of the badges 14 and their mode of response, the power level of the beam 16 is well below human health and safety standards. Moreover, the coded information stored in the badges 14 is highly secure, but can easily be changed electronically. The number of ID codes which can be stored in a badge 14 is extremely large. The system 10 is extremely versatile in that it is not restricted to a particular type or amount of coded information. Multiple badges 14 may be simultaneously interrogated and uniquely identified at remote locations. There is no requirement that the badges 14 be addressed one at a time or that they be physically placed one by one in an I/R unit.

It is to be understood that the apparatus and the method of operation taught herein are illustrative of the general principles of the invention. Modifications may readily be devised by those skilled in the art without departing from the spirit and scope of the invention. For example, codes other than the six 6-bit words and their sequences which are illustrated may be used within the framework of the invention. Still further, the invention is not restricted to a particular type of coded article or to its size and shape, or to a particular type of power source or its capacity. The system provided by the invention is not restricted to operation at a particular frequency (microwave or otherwise) or to a particular mode of transmission and response. Nor is the BIC 30 restricted to a particular type or kind or number of circuit elements.

APPENDIX

The search sequence by the I/R unit 12 and the responses of the two badges are as follows:

First Pass

| I/R Unit 12 | Badge or Badges 14 |
|---|---|
| Transmitting> Reset (RESET) | |
| Transmitting> Reset (RESET) | |
| Reflect: Unconditional (MODALL) | <Response detected |
| Transmitting> Enable data register (DATAWORD) | |
| Transmitting> Data word = 0 | |
| Transmitting> No Op signal | |
| Reflect: Any match (MODANY) | <No response |
| Transmitting> Enable data register (DATAWORD) | |
| Transmitting> Data word = 1 | |
| Transmitting> No Op signal | |
| Reflect: Any match | <Response detected |
| Reflect: A match | <Response detected |

APPENDIX-continued

The search sequence by the I/R unit 12 and the responses of the two badges are as follows:

| | | |
|---|---|---|
| Reflect B match | <No response | |
| Reflect C match | <No response | |
| Transmitting> Enable data register (DATAWORD) | | |
| Transmitting> Data word = 2 | | |
| Transmitting> No Op signal | | |
| Reflect: Any match | <Response detected | |
| Reflect: A match | <No response | |
| Reflect: B match | <Response detected | |
| Reflect: C match | <No response | |
| Transmitting> Enable data register | | |
| Transmitting> Data word = 3 | | |
| Transmitting> No Op signal | | |
| Reflect: Any match | <Response detected | |
| Reflect: A match | <No response | |
| Reflect: B match | <No response | |
| Reflect: C match | <Response detected | |
| Transmitting> Enable data register | | |
| Transmitting> Data word =4 | | |
| Transmitting> No Op signal | | |
| Reflect: Any match | <No response | |
| Transmitting> Enable data register | | |
| Transmitting> Data word = 5 | | |
| Transmitting> No Op signal | | |
| Reflect: Any match | <No response | |
| Transmitting> Enable data register | | |
| Transmitting> Data word = 6 | | |
| Transmitting> No Op signal | | |
| Reflect: Any match | <No response | |
| Transmitting> Enable data register | | |
| Transmitting> Data word = 7 | | |
| Transmitting> No Op signal | | |
| Reflect: Any match | <No response | |
| Transmitting> Enable data register | | |
| Transmitting> Data word = 8 | | |
| Transmitting> No Op signal | | |
| Reflect: Any match | <No response | |
| Transmitting> Enable data register | | |
| Transmitting> Data word = 9 | | |
| Transmitting> No Op signal | | |
| Reflect: Any match | <No response | |
| Transmitting> Enable data register | | |
| Transmitting> Data word = 10 | | |
| Transmitting> No Op signal | | |
| Reflect: Any match | <Response detected | |
| Reflect: A match | <Response detected | |
| Reflect: B match | <No response | |
| Reflect: C match | <No response | |
| Transmitting> Enable data register | | |
| Transmitting> Data word = 11 | | |
| Transmitting> No Op signal | | |
| Reflect: Any match | <No response | |
| Transmitting> Enable data register | | |
| Transmitting> Data word = 12 | | |
| Transmitting> No Op signal | | |
| Reflect: Any match | <No response | |
| Transmitting> Enable data register | | |
| Transmitting> Data word = 13 | | |
| Transmitting> No Op signal | | |
| Reflect: Any match | <No response | |
| Transmitting> Enable data register | | |
| Transmitting> Data word = 14 | | |
| Transmitting> No Op signal | | |
| Reflect: Any match | <No response | |
| Transmitting> Enable data register | | |
| Transmitting> Data word = 15 | | |
| Transmitting> No Op signal | | |
| Reflect: Any match | <No response | |
| Transmitting> Enable data register | | |
| Transmitting> Data word = 16 | | |
| Transmitting> No Op signal | | |
| Reflect: Any match | <No response | |
| Transmitting> Enable data register | | |
| Transmitting> Data word = 17 | | |
| Transmitting> No Op signal | | |
| Reflect: Any match | <No response | |
| Transmitting> Enable data register | | |
| Transmitting> Data word = 18 | | |
| Transmitting> No Op signal | | |
| Reflect: Any match | <No response | |
| Transmitting> Enable data register | | |
| Transmitting> Data word = 19 | | |
| Transmitting> No Op signal | | |
| Reflect: Any match | <No response | |
| Transmitting> Enable data register | | |
| Transmitting> Data word = 20 | | |
| Transmitting> No Op signal | | |
| Reflect: Any match | <Response detected | |
| Reflect: A match | <No response | |
| Reflect: B match | <Response detected | |
| Reflect: C match | <No response. | |
| Transmitting> Enable data register | | |
| Transmitting> Data word = 21 | | |
| Transmitting> No Op signal | | |
| Reflect: Any match | <No response | |
| Transmitting> Enable data register | | |
| Transmitting> Data word = 22 | | |
| Transmitting> No Op signal | | |
| Reflect: Any match | <No response | |
| Transmitting> Enable data register | | |
| Transmitting> Data word = 23 | | |
| Transmitting> No Op Signal | | |
| Reflect: Any match | <No response | |
| Transmitting> Enable data register | | |
| Transmitting> Data word = 24 | | |
| Transmitting> No Op signal | | |
| Reflect: Any match | <No response | |
| Transmitting> Enable data register | | |
| Transmitting> Data word = 25 | | |
| Transmitting> No Op signal | | |
| Reflect: Any match | <No response | |
| Transmitting> Enable data register | | |
| Transmitting> Data word = 26 | | |
| Transmitting> No Op signal | | |
| Reflect: Any match | <No response | |
| Transmitting> Enable data register | | |
| Transmitting> Data word = 27 | | |
| Transmitting> No Op signal | | |
| Reflect: Any match | <No response | |
| Transmitting> Enable data register | | |
| Transmitting> Data word = 28 | | |
| Transmitting> No Op signal | | |
| Reflect: Any match | <No response | |
| Transmitting> Enable data register | | |
| Transmitting> Data word = 29 | | |
| Transmitting> No Op signal | | |
| Reflect: Any match | <No response | |
| Transmitting> Enable data register | | |
| Transmitting> Data word = 30 | | |
| Transmitting> No Op signal | | |
| Reflect: Any match | <Response detected | |
| Reflect: A match | <No response | |
| Reflect: B match | <No response | |
| Reflect: C match | <Response detected | |
| Transmitting> Enable data register | | |
| Transmitting> Data word = 31 | | |
| Transmitting> No Op signal | | |
| Reflect: Any match | <No response | |
| Transmitting> Enable data register | | |
| Transmitting> Data word = 32 | | |
| Transmitting> No Op signal | | |
| Reflect: Any match | <No response | |
| Transmitting> Enable data register | | |
| Transmitting> Data word = 33 | | |
| Transmitting> No Op signal | | |
| Reflect: Any match | <No response | |
| Transmitting> Enable data register | | |
| Transmitting> Data word = 34 | | |
| Transmitting> No Op Signal | | |
| Reflect: Any match | <No response | |
| Transmitting> Enable data register | | |
| Transmitting> Data word = 35 | | |
| Transmitting> No Op signal | | |

APPENDIX-continued

The search sequence by the I/R unit 12 and the responses of the two badges are as follows:

| | |
|---|---|
| Reflect: Any match | <No response |
| Transmitting> Enable data register | |
| Transmitting> Data word = 36 | |
| Transmitting> No Op signal | |
| Reflect: Any match | <No response |
| Transmitting> Enable data register | |
| Transmitting> Data word = 37 | |
| Transmitting> No Op signal | |
| Reflect: Any match | <No response |
| Transmitting> Enable data register | |
| Transmitting> Data word = 38 | |
| Transmitting> No Op signal | |
| Reflect: Any match | <No response |
| Transmitting> Enable data register | |
| Transmitting> Data word = 39 | |
| Transmitting> No Op signal | |
| Reflect: Any match | <No response |
| Transmitting> Enable data register | |
| Transmitting> Data word = 40 | |
| Transmitting> No Op signal | |
| Reflect: Any match | <No response |
| Transmitting> Enable data register | |
| Transmitting> Data word = 41 | |
| Transmitting> No Op signal | |
| Reflect: Any match | <No response |
| Transmitting> Enable data register | |
| Transmitting> Data word = 42 | |
| Transmitting> No Op signal | |
| Reflect: Any match | <No response |
| Transmitting> Enable data register | |
| Transmitting> Data word = 43 | |
| Transmitting> No Op Signal | |
| Reflect: Any match | <No response |
| Transmitting> Enable data register | |
| Transmitting> Data word = 44 | |
| Transmitting> No Op signal | |
| Reflect: Any match | <No response |
| Transmitting> Enable data register | |
| Transmitting> Data word = 45 | |
| Transmitting> No Op signal | |
| Reflect: Any match | <No response |
| Transmitting> Enable data register | |
| Transmitting> Data word = 46 | |
| Transmitting> No Op signal | |
| Reflect: Any match | <No response |
| Transmitting> Enable data register | |
| Transmitting> Data word = 47 | |
| Transmitting> No Op signal | |
| Reflect: Any match | <No response |
| Transmitting> Enable data register | |
| Transmitting> Data word = 48 | |
| Transmitting> No Op signal | |
| Reflect: Any match | <No response |
| Transmitting> Enable data register | |
| Transmitting> Data word = 49 | |
| Transmitting> No Op signal | |
| Reflect: Any match | <No response |
| Transmitting> Enable data register | |
| Transmitting> Data word = 50 | |
| Transmitting> No Op signal | |
| Reflect: Any match | <No response |
| Transmitting> Enable data register | |
| Transmitting> Data word = 51 | |
| Transmitting> No Op signal | |
| Reflect: Any match | <No response |
| Transmitting> Enable data register | |
| Transmitting> Data word = 52 | |
| Transmitting> No Op signal | |
| Reflect: Any match | <No response |
| Transmitting> Enable data register | |
| Transmitting> Data word = 53 | |
| Transmitting> No Op signal | |
| Reflect: Any match | <No response |
| Transmitting> Enable data register | |
| Transmitting> Data word = 54 | |
| Transmitting> No Op Signal | |

APPENDIX-continued

The search sequence by the I/R unit 12 and the responses of the two badges are as follows:

| | |
|---|---|
| Reflect: Any match | <No response |
| Transmitting> Enable data register | |
| Transmitting> Data word = 55 | |
| Transmitting> No Op signal | |
| Reflect: Any match | <No response |
| Transmitting> Enable data register | |
| Transmitting> Data word = 56 | |
| Transmitting> No Op signal | |
| Reflect: Any match | <No response |
| Transmitting> Enable data register | |
| Transmitting> Data word = 57 | |
| Transmitting> No Op signal | |
| Reflect: Any match | <No response |
| Transmitting> Enable data register | |
| Transmitting> Data word = 58 | |
| Transmitting> No Op signal | |
| Reflect: Any match | <No response |
| Transmitting> Enable data register | |
| Transmitting> Data word = 59 | |
| Transmitting> No Op signal | |
| Reflect: Any match | <No response |
| Transmitting> Enable data register | |
| Transmitting> Data word = 60 | |
| Transmitting> No Op signal | |
| Reflect: Any match | <No response |
| Transmitting> Enable data register | |
| Transmitting> Data word = 61 | |
| Transmitting> No Op signal | |
| Reflect: Any match | <No response |
| Transmitting> Enable data register | |
| Transmitting> Data word = 62 | |
| Transmitting> No Op signal | |
| Reflect: Any match | <No response |
| ----- STATUS: 2 A-words, 2 B-words, 2 C-words----- | |
| Second Pass | |
| Transmitting> Enable data register | |
| Transmitting> Data word = 1 | |
| Transmitting> Enable A flag | |
| Transmitting> Enable data register | |
| Transmitting> Data word = 2 | |
| Transmitting> Enable B flag | |
| Reflect: AB match | <Response detected |
| Transmitting> Enable data register | |
| Transmitting> Data word = 3 | |
| Transmitting> Enable C flag | |
| Reflect: ABC match | <Response detected |
| Transmitting> Power down (POWERDOWN) | |
| Transmitting> Enable data register | |
| Transmitting> Data word = 30 | |
| Transmitting> Enable C flag | |
| Reflect: ABC match | <No response |
| Transmitting> Enable data register | |
| Transmitting> Data word = 20 | |
| Transmitting> Enable B flag | |
| Reflect: AB match | <No response |
| Transmitting> Enable data register | |
| Transmitting> Data word = 1 0 | |
| Transmitting> Enable A flag | |
| Transmitting> Enable data register | |
| Transmitting> Data word = 2 | |
| Transmitting> Enable B flag | |
| Reflect: AB match | <No response |
| Transmitting> Enable data register | |
| Transmitting> Data word 20 | |
| Transmitting> Enable B flag | |
| Reflect: AB match | <Response detected |
| Transmitting> Enable data register | |
| Transmitting> Data word = 3 | |
| Transmitting> Enable C flag | |
| Reflect: ABC match | <No response |
| Transmitting> Enable data register | |
| Transmitting> Data word = 30 | |
| Transmitting> Enable C flag | |
| Reflect: ABC match | <Response detected |
| Transmitting> Power down | |

APPENDIX-continued

The search sequence by the I/R unit 12 and the responses
of the two badges are as follows:

All (2) badges identified.
... Results ...
First Badge ID is: 1-2-3
Second Badge ID is: 10-20-30

We claim:

1. Apparatus for interrogating/identifying coded articles comprising:

an interrogator/reader (I/R) unit for transmitting at a suitable frequency to the articles a stream of binary bits of instruction and data words and for receiving responses from each article; and a plurality of coded articles, each of the articles having electronic circuitry for storing as digital bits an identifying code number, the circuitry having means for detecting and demodulating the incoming bit stream from the I/R unit, and for generating clock and timing signals slaved to the bit stream for framing the incoming digital words, the circuitry having logic means for responding internally to the instruction and data words of the bit stream and for responding externally to the I/R unit at selected times such that the code number of an article is uniquely identified and that article alone among many communicates solely with the I/R unit when so identified.

2. The apparatus of claim 1 wherein the circuitry of each article comprises means for holding the circuitry in quiescent state until the article receives a sufficiently strong signal from the I/R unit, and further receives a reset instruction whereupon the circuitry is enabled to an active state.

3. The apparatus of claim 1 wherein the circuitry of an article further comprises means for putting the circuitry in a powerdown condition on receipt of a suitable command from the I/R unit such that the article, after being identified, no longer responds to the I/R unit.

4. Apparatus for interrogating/identifying coded articles comprising:

an interrogator/reader (I/R) unit for transmitting at a suitable frequency to the articles a stream of binary bits of instruction and data words and for receiving responses from each article; and a plurality of coded articles, each of the articles having electronic circuitry for storing as digital bits an identifying code number, the circuitry having means for detecting and demodulating the incoming bit stream from the I/R unit, and for generating clock and timing signals slaved to the bit stream for framing the incoming digital words, the circuitry having logic means for responding internally to the instruction and data words of the bit stream and for responding externally to the I/R unit at selected times such that the code number of an article is uniquely identified and that article alone among many communicates solely with the I/R unit when so identified, wherein the I/R unit transmits a short burst of a microwave carrier signal to represent a binary "0", a longer burst of the carrier to represent a binary "1", and an extended burst of the carrier to represent a binary "1" and to provide the means whereby the article can respond to the I/R unit.

5. The apparatus of claim 4 wherein the I/R unit transmits a reset instruction word in the form of a plurality of consecutive binary "1's", and no other instruction and data word has as many consecutive binary "1's".

6. The apparatus of claim 5 wherein each article has an RF antenna, and at selected times, during an extended "1" bit, the article is enabled to modulate the impedance of its respective antenna to effect a reflected response to the I/R unit.

7. A system for simultaneously and remotely interrogating/identifying coded articles comprising:

an interrogator/reader (I/R) unit for transmitting at a suitable frequency to the articles a stream of binary bits of instruction and data words and for receiving responses from the article all together or separately; and a plurality of coded articles, each of the articles having circuitry for storing as digital bits an identifying code number as code word fragments in a plurality of memory positions, the circuitry of each article having means for detecting and demodulating the incoming bit stream from the I/R unit, and for generating clock and timing signals slaved to the bit stream for framing the incoming digital words, the circuitry having logic means for responding internally to the instruction and data words of the bit stream and for responding externally to the I/R unit at selected times as the code word fragments are identified such that when all of its code word fragments have been identified the code number of an article is uniquely identified and that article alone among many communicates solely with the I/R unit when so identified.

8. Apparatus for remote identification of coded articles comprising:

a transmit unit for transmitting to the articles a stream of binary bits of instruction and data words and for receiving responses from the articles together or separately on command; and an electronic circuit for each article comprising:

an input block for detecting and decoding an incoming bit stream from the transmit unit, and for applying to other portions of the circuit digital data bits and clock signals slaved to the incoming bit stream;

a reset wake-up block connected to the input block for receiving a reset command and for activating other portions of the circuit when the article comes within range of the transmit unit and for returning the circuit to a quiescent state in which it draws very little current when outside the range of the transmit unit;

a control logic data memory register (CLDMR) block connected to the input and reset blocks for responding to the instructions and data from the transmit unit to identify coded information stored within the electronic circuit; and a modulator block connected to the CLDMR block for sending a signal back to the transmit unit as the coded information is identified such that a plurality of the articles can be simultaneously detected and each one uniquely identified as to its respective coded information.

9. Apparatus for remote identification of coded articles comprising:

a transmit unit for transmitting to the articles a stream of binary bits of instruction and data words and for receiving responses from the articles together or separately on command; and an electronic circuit for each article comprising: an input block for detecting and decoding an incoming bit stream from the transmit unit, and for applying to other portions of the circuit digital data bits and clock signals slaved to the incoming bit stream;

a reset wake-up block connected to the input block for receiving a reset command and for activating other portions of the circuit when the article comes within range of the transmit unit and for returning the circuit to a quiescent state in which it draws very little current when outside the range of the transmit unit;

a control logic data memory register (CLDMR) block connected to the input and reset blocks for responding to the instructions and data from the transmit unit to identify coded information stored within the electronic circuit; and a modulator block connected to the CLDMR block for sending a signal back to the transmit unit as the coded information is identified such that a plurality of the articles can be simultaneously detected and each one uniquely identified as to its respective coded information, wherein the transmit unit transmits a short burst of an RF carrier signal to represent a binary "0", a longer burst to represent a binary "1", and an extended burst to represent a binary "1" and to provide the RF energy enabling each article to respond.

10. The apparatus of claim 9 in which the reset command comprises a plurality of consecutive binary "1's", and no other instruction and data word from the transmit unit contains as many consecutive "1's".

11. The apparatus of claim 10 wherein each article contains an internal power source in the form of a battery, the circuit being so configured such that during quiescent and active states thereof there is dissipated relatively low amounts of power and the operating life of the battery approaches its shelf life.

12. The apparatus of claim 11 wherein the reset block on command when coded information is identified places the circuit in powerdown condition in which the circuit no longer responds to the RF unit until the article is removed from range whereupon the reset block returns the circuit to quiescent state, such that battery power is further conserved once coded information is identified and other articles still responding to the RF unit are subsequently one-by-one put in powerdown condition as their respective coded information is identified, and all articles are rapidly and efficiently identified.

13. The apparatus of claim 8 wherein the transmit unit transmits the instruction and data words as 6-bit words, the coded information stored within the electronic circuit of each article being in the form of six 6-bit words, the reset command being six "1's", the reset command always being followed by a word with a "0" as the least significant bit.

14. The apparatus of claim 8 wherein the input block generates a clock pulse which occurs after a binary "0", but during a binary "1", such that portions of the electronic circuit easily differentiate between "0's" and "1's", and the reset block after a reset command generates a synchronizing pulse such that the incoming digital words are properly framed.

15. The apparatus of claim 8 wherein the transmit unit transmits a microwave frequency beam with a short burst representing a binary "0", a longer burst representing a binary "1", and an extended burst representing a binary "1" and also providing microwave energy for response by the circuit, and the circuit further includes an antenna for receiving the beam, the modulator block modulating the impedance of the antenna to signal the transmit unit during an extended "1".

16. A circuit for storing coded information in the form of binary words and for sending signals in response to interrogating binary word signals regarding the information comprising:

an input unit for receiving the interrogating signals and for generating binary pulses in the form of "0's" and "1's" and clock pulses having a timed relation to the "0's" and "1's";

a reset unit connected to the input unit for enabling portions of the circuit to active state upon receipt of a reset instruction of the interrogating signals and for returning the circuit to a quiescent state when there is no interrogating signal;

an instruction latch unit connected to the input unit for receiving instruction words of the interrogating signals;

a data latch unit connected to the input unit for receiving data words of the interrogating signals;

an instruction decoder unit connected to the instruction latch unit for receiving and decoding instruction words;

a memory comparator controlled by the instruction decoder unit for receiving data words and for comparing them with coded word information stored in memory positions;

a modulate decoder unit connected to the instruction decoder unit and the memory comparator unit for tabulating the comparison of data words with stored coded word information; and signal response means controlled by the modulate decoder unit for generating response signals when data words are matched with the stored coded word information.

17. The circuit of claim 16 wherein the reset unit on receipt of a reset instruction generates a synchronizing signal for framing the binary "0's" and "1's" into proper words.

18. The circuit of claim 17 wherein the reset unit, on receipt of a "powerdown" instruction of the interrogating signal, places portions of the circuit in a powerdown state in which the circuit no longer sends response signals, the reset unit returning the circuit to quiescent state when there is no interrogating signal.

19. The circuit of claim 17 wherein the reset unit only responds to a number of consecutive binary "1's" equal to or more in number than a pre-determined member of "1's", all other instruction and data words having fewer consecutive "1s".

20. The circuit of claim 16 wherein the binary pulses generated by the input unit comprise respectively a short pulse representing a binary "0", a long pulse representing a binary "1", the clock pulses being generated occurring after a binary "0" and during a binary "1".

21. An electronically coded article having a support, an antenna, and an electronic circuit, the circuit comprising:

an input detector/demodulator connected to the antenna for detecting incoming signals wherein a short burst of signal represents a binary "0", a longer burst represents a binary "1", and an extended burst represents a binary "1" and also provides RF energy for a response signal, the detector/demodulator generating binary "0" and "1" pulses and clock pulses in accordance with the digital signals;

memory means for storing coded information as a plurality of digital words;

logic and control means for receiving the binary "0's" and "1's" and clock pulses from the detector/demodulator and for comparing the binary pulses in sequence with the coded words stored in the memory means and for determining when the stored words have been matched to data sent by the RF signal; and signalling means controlled by the logic and control means for modulating the antenna during extended "1" signals to generate response signals as data is matched to stored words.

22. An electronically coded article comprising:

an insulating support;

an RF antenna mounted on the support;

a battery mounted on the support; and an electronic circuit mounted on the support and being connected to the antenna and battery, the circuit comprising:

an input detector/demodulator (D/D) for detecting incoming signals wherein a short duration burst of the RF signal represents a binary "0", and a longer burst represents a binary "1", the detector/demodulator generating binary "0" and "1" bit pulses and clock pulses slaved to the signals;

memory means for storing digital bit information as a plurality of coded words;

logic and control means for receiving the binary bit and clock pulses from the D/D and for comparing the binary bit pulses with the coded words stored in the memory means;

reset means connected to the D/D for placing the circuit in quiescent state in the absence of an RF signal and for enabling the circuit to active state on receipt of a reset instruction; and signalling means connected to the logic and control means for generating a response signal when the stored coded words match with respective binary bit pulses.

23. The article of claim 22 wherein the reset means further puts the circuit in a powerdown state in which the signalling means is no longer active after signalling that the stored coded words and binary bit pulses have been matched.

24. The article of claim 22 wherein the signalling means, in generating a response signal, modulates the impedance of the antenna during a suitably timed burst of the RF signal.

25. The article of claim 22 further combination with:

a plurality of identical articles each of which contains unique identifying information in its stored coded words; and an interrogator/reader (I/R) unit for transmitting signals to interrogate all of the articles simultaneously by means of instruction and data words and to uniquely identify each article by the response signals from the articles.

26. The article of claim 25 wherein the I/R unit transmits a microwave frequency beam with a short burst of the beam representing binary "0", a longer burst representing a binary "1" and an extended burst representing a binary "1" and also providing microwave energy for each article in generating a response signal.

27. The article of claim 25 wherein the I/R unit transmits a unique sequence of binary "1's" to instruct the reset means of an article to activate its respective circuit, and transmits a unique sequence of "0's" and "1's" to instruct the reset means to powerdown the circuit such that all of the articles are collectively instructed and each is individually put in powerdown state.

28. The article of claim 25 in which the I/R unit simultaneously receives signals from any and all of the articles and iteratively transmits instruction and data words to the articles to uniquely identify the information in each one.

29. The article of claim 28 in which the instruction and data words are in the form of 6-bit words, and the coded information in each article is stored as six 6-bit words.

30. The article of claim 22 wherein the input of D/D comprises a first pair of metal oxide semiconductor (MOS) transistors connected as a common-gate source-driven amplifier, and a second pair of MOS transistors supplying the first pair of MOS transistors with constant currents, the currents being unbalanced, a source of the first pair of MOS transistors being connected to the antenna such that the input stage is highly sensitive to microwave signals and draws extremely low current from the battery.

31. The article of claim 22 wherein the coded words stored in the memory means may be re-written by a proper sequence of signals such that all articles are identical as manufactured and each is uniquely identified by electronically written and stored code words.

32. The article of claim 26 wherein the I/R unit has separate transmit and receiving antennas and a quadrature homodyne arrangement connected to the receiving antenna such that phase differences in the received signals from the articles are minimized.

33. The article of claim 31 wherein the I/R unit has an RF switch which applies bursts of low microwave frequency power to the transmit antenna in accordance with the instruction and data words transmitted to the articles.

34. The article of claim 33 in which the transmit antenna of the I/R unit transmits a burst of a directional microwave beam lasting about 250 nanoseconds to represent a binary "0", a burst of about 2 microseconds to represent a binary "1", and an extended burst lasting much longer than 2 microseconds to represent a binary "1" and to provide power to each article in responding to the interrogator/reader unit with a signal received by the receive antenna.

35. The article of claim 34 wherein a binary "1" represents approximately a 50% duty cycle of the microwave beam such that the binary "1's" of a reset instruction are uniquely and accurately distinguishable from other signals.

36. The article of claim 35 in which the I/R unit always transmits a binary "0" as a first bit following a reset instruction such that false operation of an article is precluded an words are properly framed.

37. An electronic circuit for a coded article comprising:

an input detector/demodulator (D/D) for detecting incoming digital word signals, the input D/D having a first pair of metal oxide semiconductor (MOS) transistors connected as a common-gate source-driven amplifier, the source of one of the transistors being connected to an input for the signal, the D/D also having a second pair of MOS transistors supplying the first pair of MOS transistors with substantially constant currents which are unequal, the D/D generating binary "0" and "1" pulses corresponding to the digital word signals;

memory means for storing coded information as a plurality of digital words;

logic and control means connected to the D/D and memory means for comparing digital words from the signal with the words stored in the memory means; and signalling means connected to the logic and control means for generating a response signal when the digital words of the signals and the stored words match.

38. The circuit of claim 37 further combination with reset means for placing the circuit in a quiescent state in the absence of an incoming signal, for placing the circuit in an active state in the presence of the signal, and for placing the circuit in a powerdown inactive state when the digital words of the signals and the stored words match, the reset means automatically returning the circuit to quiescent state in the absence of the signal.

39. The circuit of claim 37 in which the D/D also generates clock pulses in timed relation to the binary "0" and "1" pulses, a clock pulse occurring after a binary "0" and during a binary "1".

40. The circuit of claim 38 wherein the reset means when placing the circuit in an active state also generates a synchronizing pulse for accurate framing of the binary "0" and "1" pulses into digital words corresponding to the digital word signals.

41. The circuit of claim 37 wherein the D/D has current switching means for applying additional current at timed intervals to one of the first pair of MOS transistors, the current switching means being controlled by the binary "0" and "1" pulses, such that input efficiency of the D/D is enhanced.

42. A method of interrogating and identifying electronically coded articles comprising the steps of:

storing coded information in the article in the form of a plurality of stored digital word fragments;

interrogating an article or articles by means of sequential digital instructions and data words on all possible combinations of stored words;

responding by each article when a match between a data word and a stored word occurs;

determining that at least one article has a matched data and stored word in all of the word fragments of its coded information;

sorting through the possible combinations of matched word fragments in all of the articles which have responded; and identifying the articles one-by-one, each with its unique stored word fragments until all of the articles are identified.

43. The method of claim 42 further comprising the step of instructing an article once all of its stored word fragments have been identified not to respond while the other articles are still being identified.

44. A method of remotely interrogating and identifying articles in which a plurality of coded digital words are electronically stored comprising the steps of:

transmitting a bit stream of instruction and data words to each and all articles present to determine the presence of at least one article;

sequentially sorting through all possible combinations of values of the plurality of coded words stored in each and all articles;

tabulating the matches found between transmitted and stored words of each and all articles and responding by the article when a match is found;

determining that at least one article has matches with all of its stored words;

transmitting instruction and data words to the articles to sort out all possible combinations of matched words in all of the articles which have responded; and responding by the articles one-by-one when each is uniquely identified.

45. The method of claim 44 in which, when the presence of an article or articles is determined, the article or articles are activated from a quiescent state to an active reset state in which they are enabled to respond, and when an article is uniquely identified, it is instructed to go into an inactive powerdown state in which it no longer responds while any remaining articles are being identified.

46. A search sequence for identifying articles having coded information in the form of a plurality of stored data words, the sequence comprising:

a first pass to determine if an article is present and if so sequencing through all possible combinations of data values of each of the plurality of data words stored in the article or articles and tabulating each match between a possible data value and an actual stored word; and a second pass in which the possible combinations at the tabulated matches of the stored words in all the articles are sequentially sorted through, and each article is uniquely identified and set aside one-by-one until all of the articles are identified.

47. A method of remotely interrogating and uniquely identifying a number of articles in which coded information is electronically stored in the form of a plurality of digital words comprising the steps of:

transmitting signals in the form of a bit stream of instruction and data words to determine whether an article or articles are present within the range of the signals and if present instructing each article to wake-up from a quiescent state to an active state and to generate a signal response;

tabulating the matches found between transmitted and stored words of each and all articles and activating the articles to respond when matches are found;

determining that at least one article has matches with all of its stored words;

transmitting instruction and data words to the articles to try all possible combinations of matched words in all of the articles and instructing the articles to respond as combinations of matches are found; and communicating exclusively with each article after all of its stored words are uniquely identified and thereafter placing the article in inactive state in which it no longer responds to the instruction and data words while other articles are being identified.

48. The method of claim 47 in which the stored words are in the form of six 6-bit words, and the instruction and data words are each of 6 bits.

49. The method of claim 48 in which the instruction and data words are in the form given in Table 1.

50. The method of claim 47 wherein the most significant bit of certain instructions is an extended burst of the sisal representing a binary "1" and also providing RF energy to enable the articles in signalling a response.

51. The method of claim 47 wherein the articles are activated by a reset instruction in the form of a plurality of binary "1's", no other instruction or data word having as many "1's".

52. The method of claim 47 wherein the step of communicating exclusively with an article includes instructing the article to powerdown to inactive state so long as the article remains within range of the signals, the article automatically returning itself to a quiescent state when removed from the signal.

53. The method of claim 50 wherein each article is provided with its own internal battery and contains an antenna, the article generating a response signal by modulating the impedance of the antenna during an extended "1" burst of the signal.

54. The method of claim 53 wherein each article contains a CMOS integrated circuit which responds to the signals in accordance with the transmitted instruction and data words, each article having its coded information electronically written into a plurality of memory word positions such that the power consumed by the article is low.

55. Apparatus for interrogating and identifying coded articles comprising:

an interrogator/reader (I/R) unit for transmitting at a suitable frequency within a wide range of frequencies to the articles a stream of binary "0's" and "1's" of instruction and data words and for receiving responses from each article; and a plurality of coded articles, each of the articles having circuitry for storing as digital bits coded information including an identifying code number, the electronic circuitry of each article having means for detecting and demodulating the incoming bit stream from the interrogator/reader unit, and for generating clock and timing signals slaved to the bit stream for framing the incoming digital words, the circuitry having logic means for responding internally to the instruction and data words of the bit stream and for responding externally to the I/R unit at selected times such that the code number of an article is uniquely identified and that article alone among many communicates solely with the interrogator/reader unit when so identified.

56. The apparatus of claim 55 wherein the I/R unit transmits a selected sequence of commands to rewrite at least a portion of the coded information in a given article such that the information in each article is remotely reprogrammable.

57. The apparatus of claim 55 wherein each article has a single input/output connection for receiving instruction and data words from the I/R and for responding to the interrogator/reader at selected times.

58. The apparatus of claim 55 the binary "0" and "1" bits have substantially different time durations.

59. The apparatus of claim 58 wherein the binary "0" bits have a much shorter duration than the binary "1" bits, the clock signals generated by each article occurring after a binary "0" but during a binary "1".

* * * * *